United States Patent [19]

Nagaya et al.

[11] Patent Number: 5,721,692
[45] Date of Patent: Feb. 24, 1998

[54] MOVING OBJECT DETECTION APPARATUS

[75] Inventors: Shigeki Nagaya, Tukuba; Takafumi Miyatake, Hachiouji; Takehiro Fujita, Kokubunji, all of Japan

[73] Assignee: Hitachi, Ltd., Tokyo, Japan

[21] Appl. No.: 601,951

[22] Filed: Feb. 15, 1996

[30] Foreign Application Priority Data

Feb. 17, 1995 [JP] Japan ..................... 7-029099

[51] Int. Cl.[6] ........................................ F41G 5/00
[52] U.S. Cl. ..................... 364/516; 342/179; 382/206
[58] Field of Search .......................... 364/516; 348/155; 382/103, 10, 14, 28, 206, 216, 218; 342/179

[56] References Cited

U.S. PATENT DOCUMENTS 5,465,115  11/1995  Conrad et al. ..................... 348/155
5,500,904  3/1996  Markandey et al. ................ 382/103

OTHER PUBLICATIONS

IEICE Trans. D–II, vol. J72–DII, No. 6 pp. 855–865 (1989).
IPSJ SIG–Notes, CV 75-5 "Segmentation of People in Motion" by Akio Shio, et al. (1991).

IEICE Trans. D–II vol. J77–DII, No. 9 pp. 1716–1726 (1994).

*Primary Examiner*—Emanuel T. Voeltz
*Assistant Examiner*—Thomas Peeso
*Attorney, Agent, or Firm*—Antonelli, Terry, Stout, & Kraus, LLP

[57] ABSTRACT

A moving object is detected from a movie which has a complicated background. In order to detect the moving object, there is provided a unit for inputting the movie, a display unit for outputting a processed result, a unit for judging an interval which is predicted to belong to the background as part of a pixel region in the movie, a unit for extracting the moving object and a unit for calculating the moving direction and velocity of the moving object. Even with a complicated background in which not only a change in illumination condition, but also a change in structure occurs, the presence of the structure change of the background can be determined so as to detect and/or extract the moving object in real time. Additionally, the moving direction and velocity of the moving object can be determined.

20 Claims, 24 Drawing Sheets

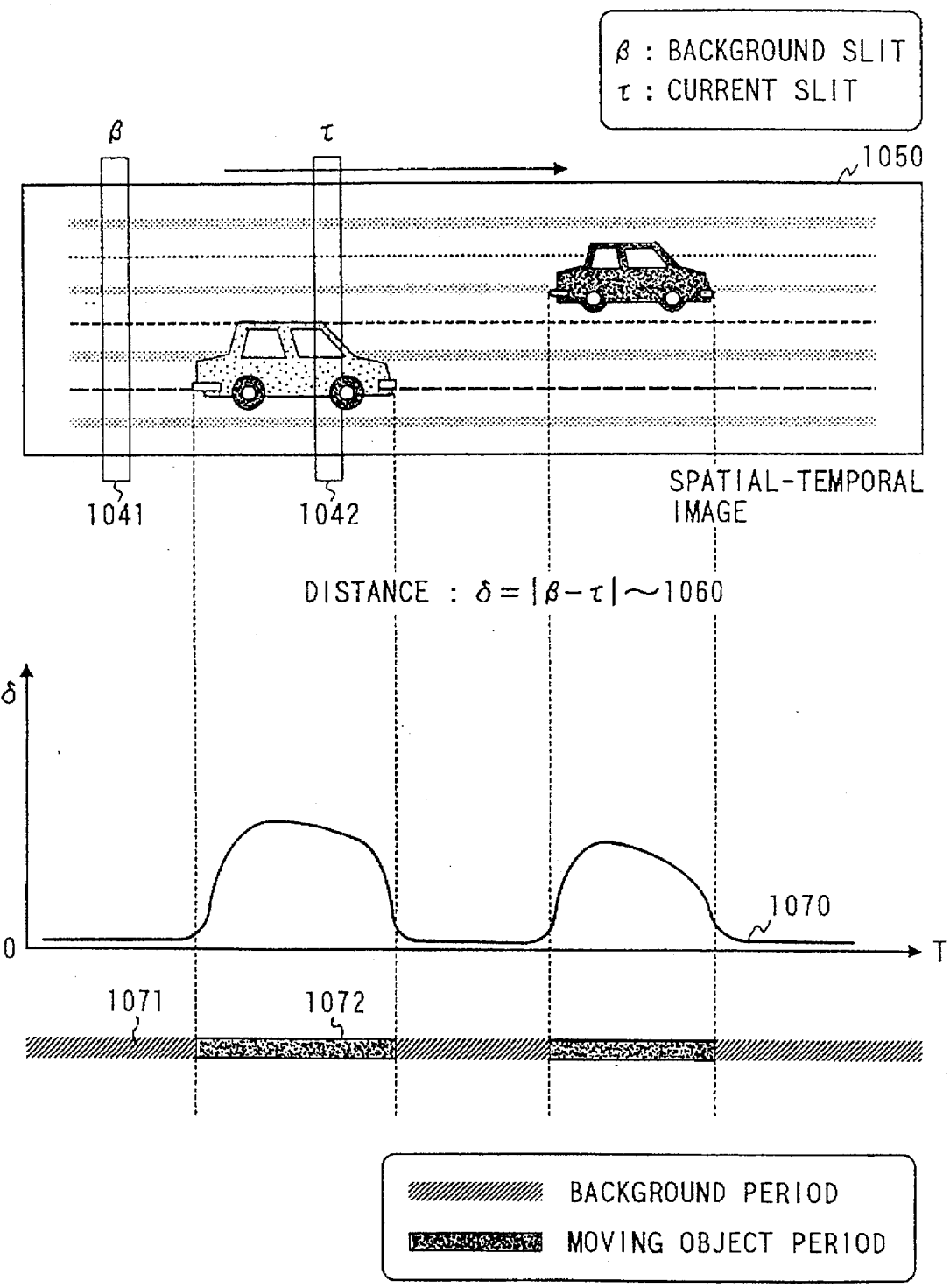

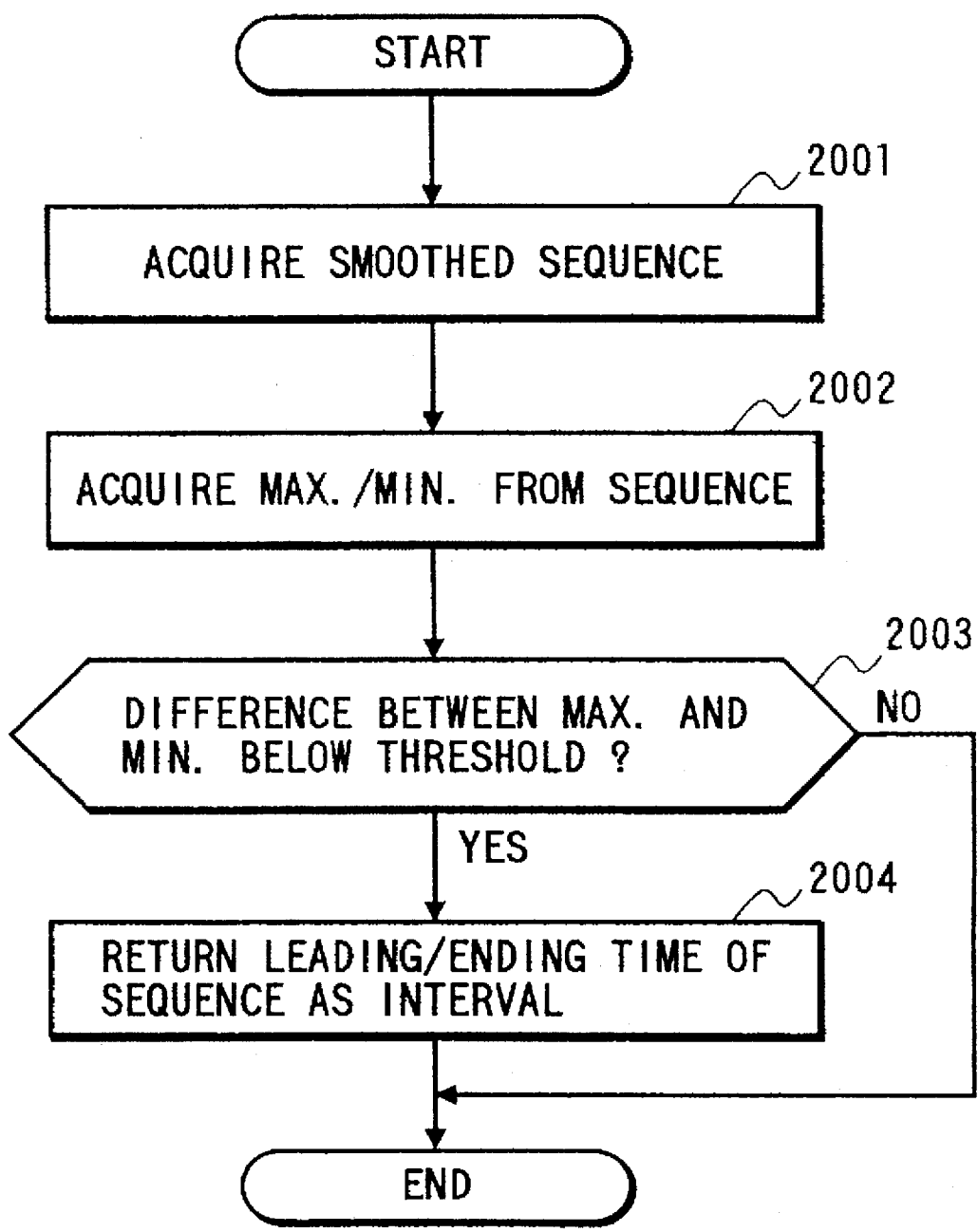

FIG. 9(a)
$$V = (P_1, P_2, P_3, \text{-----------}, P_N) \sim 1048$$
FIG. 9(b)
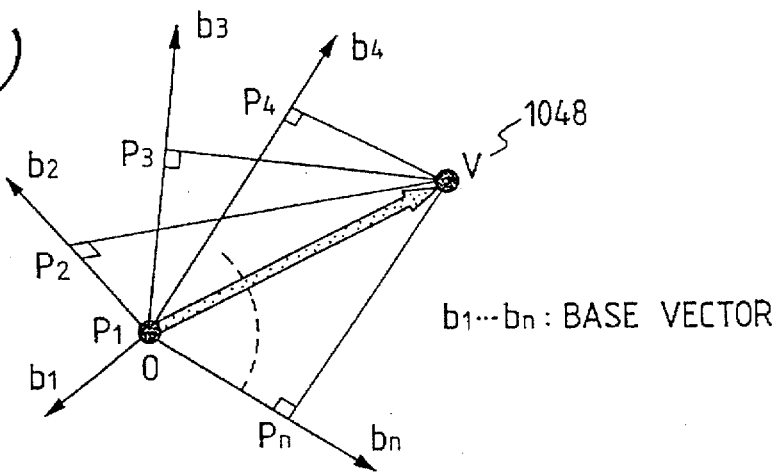
$b_1 \cdots b_n$ : BASE VECTOR
FIG. 9(c)
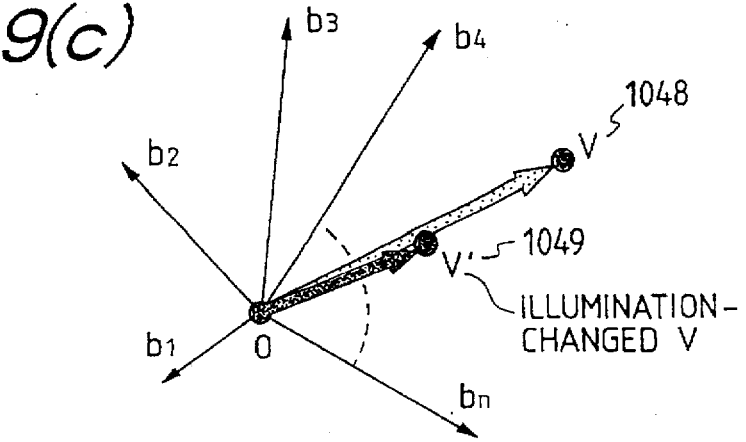
ILLUMINATION-CHANGED V

MAPPING OF SLIT VECTOR ON UNIT SPHERE

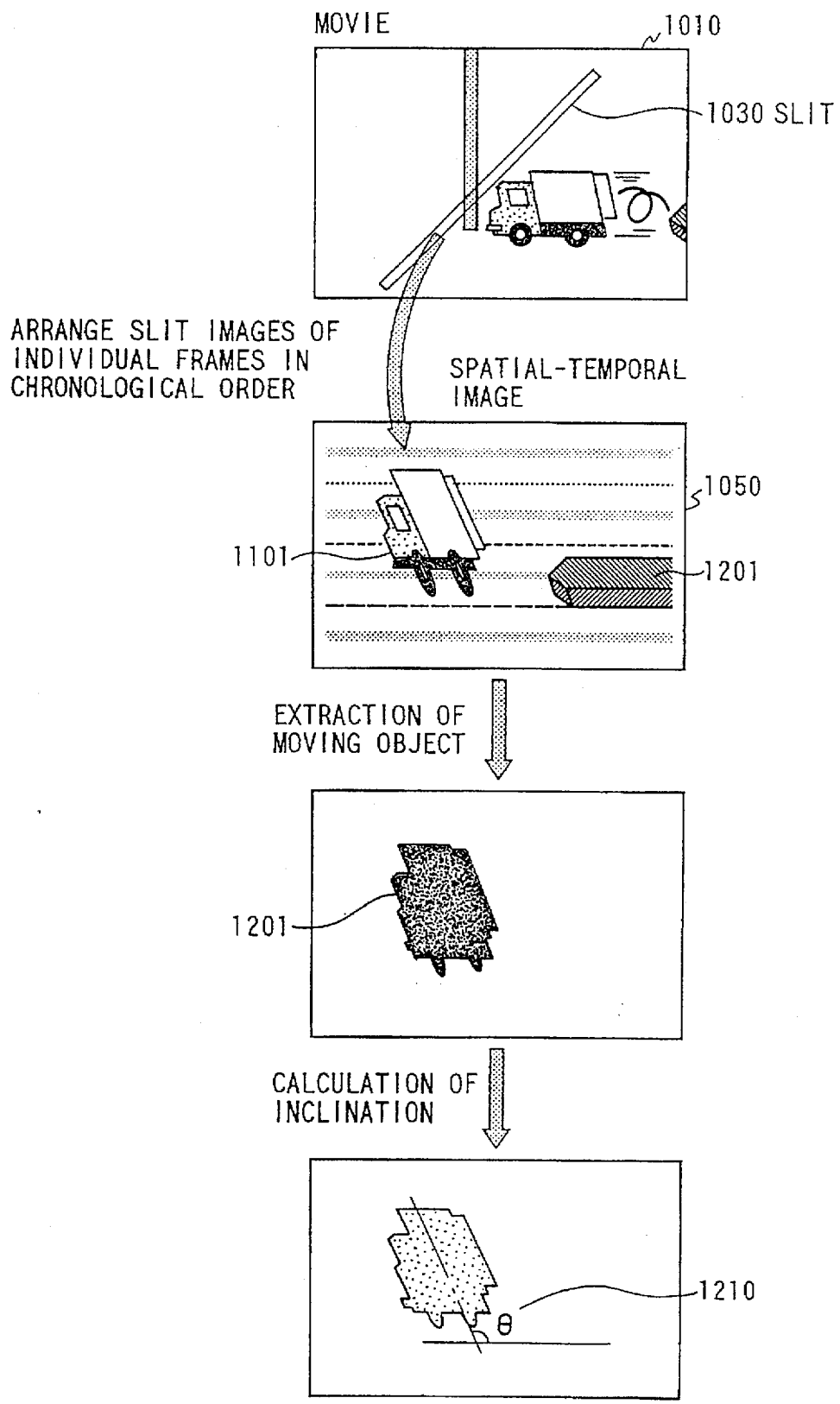

FIG. 15(a)
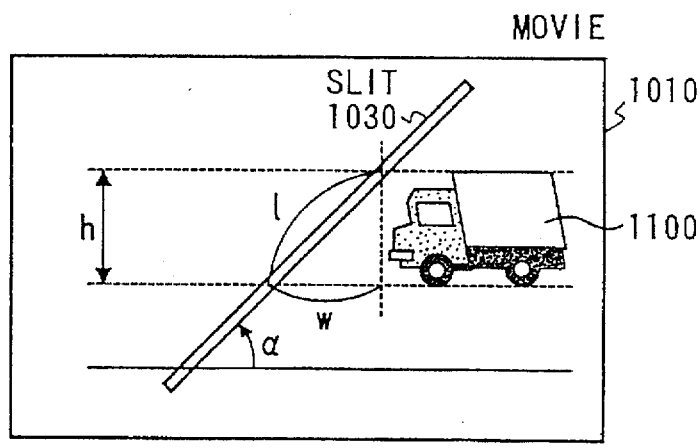
MOVING DISTANCE ON WINDOW : $w = l\cos\alpha$
MOVING VELOCITY ON WINDOW : $v = w/t$ ~1610
FIG. 15(b)
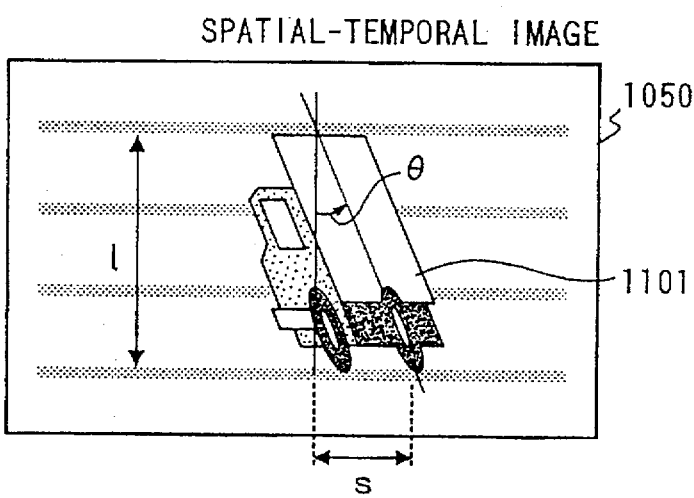
FRAME RATE : $f$ (frames/sec)
MOVING DISTANCE IN SPATIAL-TEMPORAL IMAGE : $s = ft = l\tan\theta$ ~1620
FIG. 15(c)
$$\begin{cases} t = (l/f\tan\theta) \\ \therefore v = (l\cos\alpha)/(l/f\tan\theta) \\ \qquad = f\cos\alpha/\tan\theta \end{cases}$$ ~1630

$$P_n = \begin{cases} \text{BACKGROUND} & \left( \tau_l: \text{LARGE DISPERSION}, \left| \frac{\tau_l}{|\tau_l|} - \frac{\beta_l}{|\beta_l|} \right| \leq T_h \right) \\ \text{BACKGROUND} & \left( \tau_l: \text{SMALL DISPERSION}, \left| \tau_l - \beta_l \right| \leq T_h \right) \\ \text{MOVING OBJECT (else)} \end{cases}$$

FIG. 25
CHANGE IN BACKGROUND STRUCTURE (e.g., STOPPED) ~130
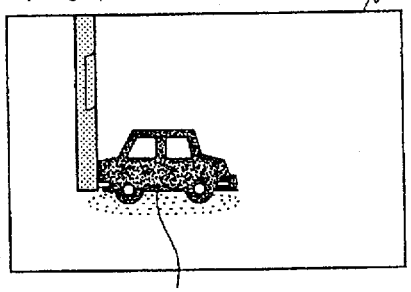
131
DIFFERENCE FROM BACKGROUND IMAGE →
DETECTION OF BACKGROUND STRUCTURE CHANGE ~140
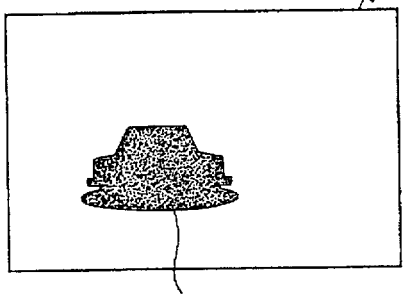
141
PASSAGE OF MOVING OBJECT AFTER BACKGROUND STRUCTURE CHANGE DIFFERENCE FROM BACKGROUND IMAGE ~150
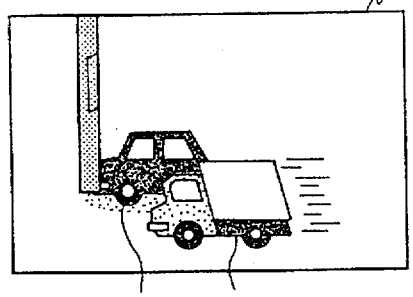
131  151
DIFFERENCE FROM BACKGROUND IMAGE →
COEXISTENCE OF STRUCTURE CHANGES OF MOVING OBJECT AND BACKGROUND ~160
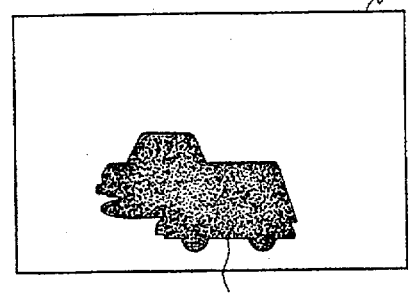
161

MOVING OBJECT DETECTION APPARATUS

BACKGROUND OF THE INVENTION

The invention relates to moving object detection apparatus and method for monitoring the movie which is inputted with a camera, to measure the traffic flows on roads, to detect failures on railroads/crossings, and to prevent crimes in banks or convenience stores.

At present, various places such as the roads, the crossings or the service floors of banks are monitored with the camera movies. This technique is intended to prevent traffic jams, accidents or crimes in advance by monitoring objects moving in a specified place (as will be called the "moving bodies" or "moving objects"). In the traffic flow surveys frequently undergone at roads, for example, the statistical data on the traffic flows can be collected by monitoring how many automobiles, motorbikes, bicycles or pedestrians pass the monitoring area and by classifying the traffic flows into various categories. In the monitoring of the traffic jams on the roads, the accidents at the crossings or the service floors of banks or convenience stores, on the other hand, the accidents or crimes can be prevented in advance by detecting failures such as the jams, the stops of automobiles due to engine stalls, the falling objects or the suspicious behaviors of customers. Thus, there are high needs for movie-monitoring the moving objects. However, this movie-monitoring at present cannot go without resorting to the man powers because of its technical level. This causes problems of high cost and easy introduction of human mistakes. With this environment, automation of the monitoring by computers or the like is desired, and various methods have been proposed using models or templates.

The actual case of the movie-monitoring frequently occurs not indoors but outdoors. As a result, the objects or backgrounds are intensely influenced by the climate conditions such as rainfalls or snowfalls or the illumination conditions such as the sunshines or street lights. By the shadow of the environment or the reflection of the light due to the rainfalls, for example, the apparent shapes are highly changed. When the illumination changes from the sunlight to the mercury lamp, moreover, the contrast in brightness or color between the target to be monitored and the background will change. Even the movie at the same location is changed in its image characteristics with seasons or times. It frequently follows that an effective characteristic quantity could be extracted under one condition but not under another condition. Thus, under a complicated background, the monitoring has very low reliability depending upon the kind of the characteristic quantity to be used in the recognition algorithm so that its practicability is difficult.

The asymptotic illumination change of those problems coming from the complicated backgrounds is solved by the moving object detection method using the background difference. This background difference is the method of separating/extracting only a moving object by taking a difference between the background image reflecting only the background and the frame image containing the moving object by using that the background will hardly change in the movie taken with a fixed camera. The background image is automatically acquired by the method determining and using the medians and modes of the intensity of each pixel in the time axis. FIG. 24 simply shows the principle of the moving object detection method using the background difference. If a background image 100 is given in advance for a scene 110 to be monitored, a moving object 111 can be separated/extracted as a scene change 121 from the differential image 120 between the background image 100 and the scene 110.

The feature of this method is robust to any monitoring place. This is because any complicated background such as a utility pole 101 would be deleted by the differential operation if the camera had no motion. The prior art of the moving object detection method according to the background difference is exemplified by 1) IEICE Trans. D-II, Vol. J72-DII, No. 6, pp. 855–865, 1989, 2) IPSJ SIG-Notes, CV 75-5, 1991, and 3) IEICE Trans. D-II Vol. J77-DII, No. 9, pp. 1716–1726, 1994.

However, the method of the prior art has a problem that it is weak to the structure change of the background. FIG. 25 simply shows the problem of the method of the prior art. For example, it is assumed that a stopped object 131 appear in the scene of the background image 100 to cause the structure change of the background, as shown in a scene 130. According to the method of the prior art, the parked object 131 is extracted as a change 141, as indicated in a differential image 140 between the background image 100 and the scene 130. However, it is impossible to discriminate whether the change 141 is caused by the moving object or the structure change of the background. In a scene 150 on and after the structure change of the background, therefore, the structure change and the moving object so merge into each other, as in the region 161 in a scene 160, that they cannot be separated, even after a moving object 151 passed.

A number of structure changes of the background occur in the actual movie monitoring. For example, an automobile having passed a road may be stopped at the parking meter on a road edge to form part of a new background. On the contrary, an object having been stopped at the parking meter may move to make the hidden region into a portion of the new background. When the passing object drops an object onto the road, the falling object may also form part of the new background. In addition, the object having passed the snow may leave its tracks.

Thus, the method of the prior art using the background difference could not cope with the structure change of the background. This is because it is impossible to discriminate whether the portion having a changed background structure belongs to the moving object or a new background region. For this discrimination, it is conceivable to execute the motion analysis of the moving object. For the motion analysis algorithm such as the optical flow, however, the number of moving objects has to be known in advance. Once the number of the moving objects is mis-recognized, the subsequent processing will find it difficult not only to separate the background change region but also the presence of the background change itself.

It can be enumerated as another problem that the separation/extraction of the moving object are unstable. This is because the background change region and the moving object region could not always be correctly discriminated for the aforementioned reason even if the presence of the background change could be Judged. When a parcel is dropped from a moving object and left on the road, for example, the moving object region is also updated as the background if the change in the new background by the falling object is detected and if the background is updated. As a result, a dust comes into the region where the moving object has been present at the background updating time. Thus, after the structure change of the background, the moving object couldn't be correctly separated/extracted from the background to make it resultantly difficult to continue the monitoring process.

In order to solve the problems thus far described, the invention has the following three objects.

A first object is to judge whether a pixel region of interest belongs to the background or the moving object, thereby to judge the kind of the background change, if any.

A second object is to extract only the moving object by separating/judging the background change region and the moving object region.

A third object is to easily calculate the moving direction or velocity of the moving object extracted.

SUMMARY OF THE INVENTION

First of all, the invention comprises, as its basic component means, means for inputting a movie, means for extracting/detecting a moving object, and means for outputting the processed result as the movie.

Next, the following means are provided for realizing the Judgment of the presence of the structure change in the moving object and the background for a predetermined pixel region according to the first object.

The means are: means for acquiring the pixel region to be judged for the background, from the movie; means for calculating the correlation between the pixel region at a time and the pixel region of each frame; means for holding the calculated correlated values sequentially; means for judging the interval which is predicted to belong to the background because of absence of the moving object; and means for deciding the interval for which the moving object is present, from the interval which is predicted to belong to the judged background. Moreover, the means for deciding the interval for which the moving object is present, comprises: means for judging the present of the background change from the interval which is predicted to belong to the judged background; means for classifying the background change into the illuminance change or the structure change; and means for deciding the interval for which the moving object is present, from the interval which is predicted to belong to the judged background.

The following means are provided for realizing the extraction of only the moving object by separating/judging the background change region and the moving object region according to the second object.

The means are: means for acquiring the frame image containing the moving object and the images having only two projected backgrounds (or the original and future background images before and after the interval for which the moving object is present), as located before and after the interval, for which the moving object is present, from the movie; means for creating the original background differential image and the future background differential image from the frame image and the original and future background images; means for determining the merging region by a logical product from the original background differential image and the future background differential image; and means for cutting the moving object image out of the frame image and the merging region.

The following means are provided for easily calculating the moving direction or velocity of the extracted moving object according to the third object.

The means are: means for cutting out the spatial-temporal image of the interval for which the moving object is present; means for separating the slit images (or the original background slit image and the future background slit image before and after the interval for which the moving object is present) of only the two backgrounds, as located before and after the interval for which the moving object is present, and the moving object region from the spatial-temporal image; means for correcting the moving object region by the morphology processing and the hole fill processing; means for determining a common merging region from the corrected two background differential images; and means for estimating the direction/velocity of the moving object by calculating the inclination of the obtained merged regions.

The other characteristic moving object detection apparatus and method will become apparent from the description to be made in the following.

On the basis of the movie inputted by the movie input means, according to the invention, the moving object is detected by the following procedure.

First of all, the structure changes in the moving object and the background are judged for a specific pixel region. The pixel region to be judged for the background is acquired from the movie and for each frame, and the correlation with the pixel region at a time is calculated. The correlated values thus calculated can be handled as a sequence. Next, for the sequence of the correlated values, the interval, which is predicted to belong to the background because of absence of the moving object, is judged. Whether or not the background has changed for the interval to be predicted to belong to the background is judged to classify the judged background change into the illuminance change or the structure change. At last, the interval for which the moving object is present is decided from the interval to be predicted to belong to the background.

Next, only the moving object is extracted by separating/judging the background change region and the moving object region. First of all, the frame image containing the moving object is acquired on the basis of the interval for which the moving object is present. Next, the original background image and the future background image, as located before and after the interval for which the moving object is present, are acquired from the movie. Next, the original background differential image and the future background differential image are created from the frame image and the original and future background images. The merged region is determined by the logical product from the original background differential image and the future background differential image until the moving object image is cut out of the frame image and the merged region.

Then, the moving direction or velocity of the extracted moving object is simply calculated. First of all, the spatial-temporal image of the interval, for which the moving object is present, is cut out. Next, the moving object region is separated from the background slit image and the spatial-temporal image. The moving object region is corrected by the morphology and the hole fill processings. The merged region is determined from the logical product of the original background differential image and the future background differential image corrected, until the inclination of the merged region is calculated to estimate the direction/velocity of the moving object.

At last, the aforementioned processed results are displayed on the display by the result output means.

Still further advantages of the present invention will become apparent to those of ordinary skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purpose of limiting the same, and wherein:

FIG. 4 shows a relation in distance between a background slit 1041 and a current slit 1042 at each time;

FIG. 7 shows a flow chart of background period Judgment means 720;

FIG. 9(a) through 9(c) show the influences of an illuminance change upon a slit vector when the slit image 1040 is deemed as a vector;

FIG. 14 shows a slit setting method for analyzing the motion of the moving object 1100 in the movie 1010, and the spatial-temporal image 1050 obtained by the method;

FIGS. 15(a) through 15(c) explain the summary of a method for calculating the moving direction/velocity 1003 of the extracted moving object from the inclination of a slit 1030 and the inclination 1210 of the moving object;

FIG. 25 shows a problem in the moving object detection/extraction by the conventional method using the background difference.

DETAILED DESCRIPTION OF THE PREFERRED AND ALTERNATE EMBODIMENTS

One embodiment of the invention will be described in detail in the following.

Figure 2:
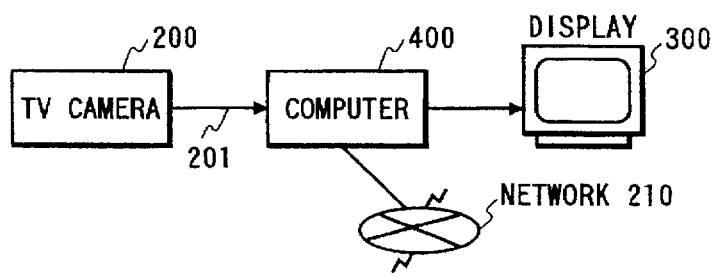
FIG. 2 shows a system construction for realizing the invention.

FIG. 2 shows one embodiment of the hardware construction for realizing the invention. A TV camera 200 takes e scene to be monitored, transforms it into video signals 201 and transmits them to a computer 400. At this transmission, the video signals 201 are digitized for each frame and stored in the memory of the computer 400. This computer 400 reads out its memory content follows the processing program which is stored at another address in the memory, to judge whether the pixels on the frame image belong to the background or the moving object, to extract the moving object and to estimate the moving direction/velocity. The image of the moving object extracted and the other accompanying processed results are transmitted to a display 300. This display 300 outputs the results processed by the computer 400, such as the background image and the image and moving direction/velocity of the moving object to the screen. These informations are transmitted through a network 210 to the display of a safety control unit or a monitor center.

Figure 1:
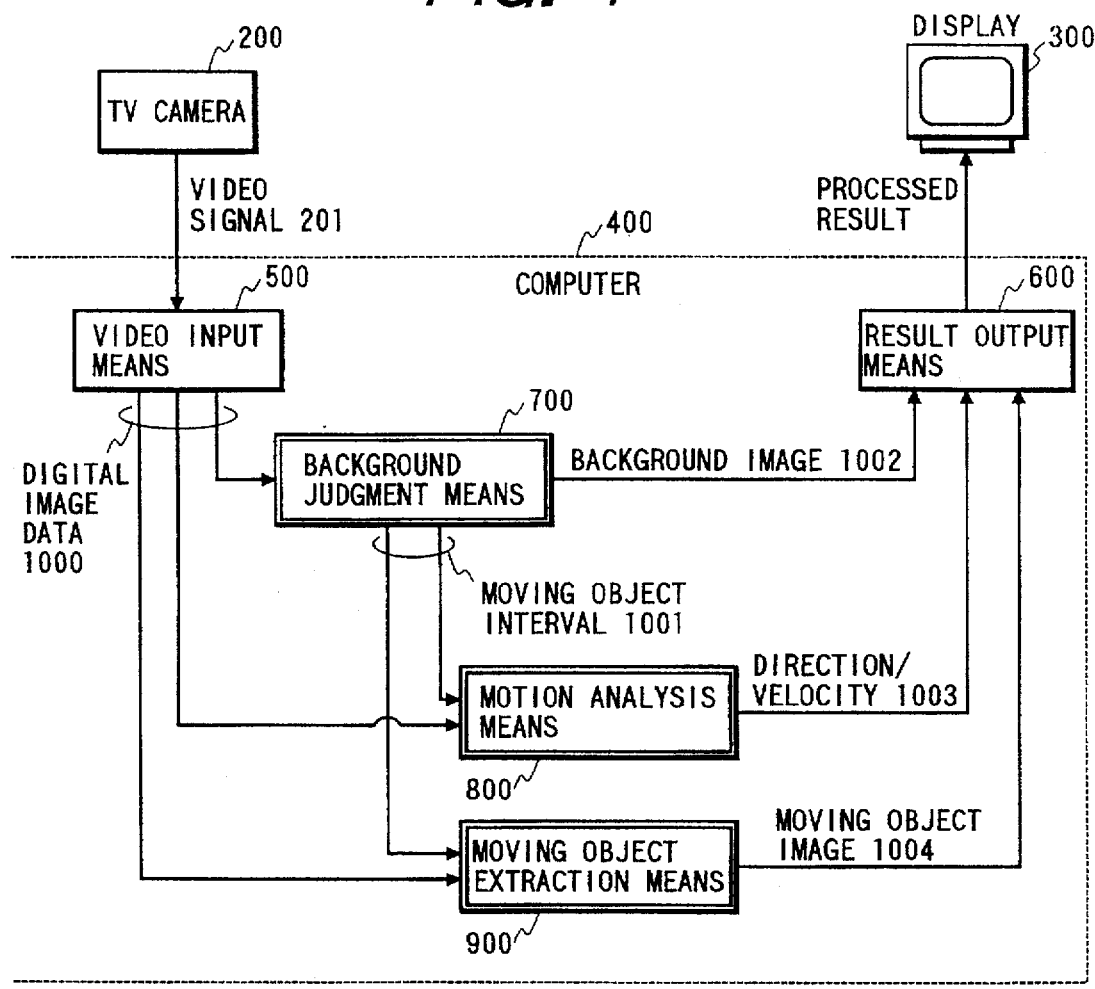
FIG. 1 shows a hardware construction for realizing the invention.

FIG. 1 shows one example of the system construction which is realized in the computer 400. This computer 400 includes video input means 500, result output means 600, background Judgment means 700, motion analysis means 800 and moving object extraction means 900. The video input means 500 transforms the video signals into digital image data 100 for each frame and transmits them to the background judgment means 700, the motion analysis means 800 and the moving object extraction means 900.

The result output means 600 displays the processed results of the background judgment means 700, the motion analysis means 800 and the moving object extraction means 900, such as a background image 1002, a moving direction/velocity 1003 and a moving object image 1004 on the display such that they can be easily observed by the user.

The background Judgment means 700 judges whether each pixel on the digital image data 1000 belongs to the background, the moving object or the change in the background structure, and transmits a moving object period information 1001 to the motion analysis means 800 and the moving object extraction means 900. The moving object period information 1001 is a collection of the period (or interval) for each pixel, in which the moving object is judged to exist. In addition, the background judgment means 700 transmits the background image 1002 or the accumulation of the pixels judged as the background to the result output means 600. The detail of the background judgment method will be described with reference to FIGS. 3 to 12.

The motion analysis means 800 calculates the moving direction/velocity 1003 of the moving object from the digital image data 1000 and the moving object period information 1001 and transmits them to the result output means 600. The detail of the method of calculating the moving direction/velocity of the moving object will be described with reference to FIGS. 13 to 19.

The moving object extraction means 900 extracts the moving object image 1004 from the digital image data 1000 and the moving object period information 1001 and transmits it to the result output means 600. The detail of the extraction unit of the moving object image 1004 will be described with reference to FIGS. 20 to 22.

Figure 3:
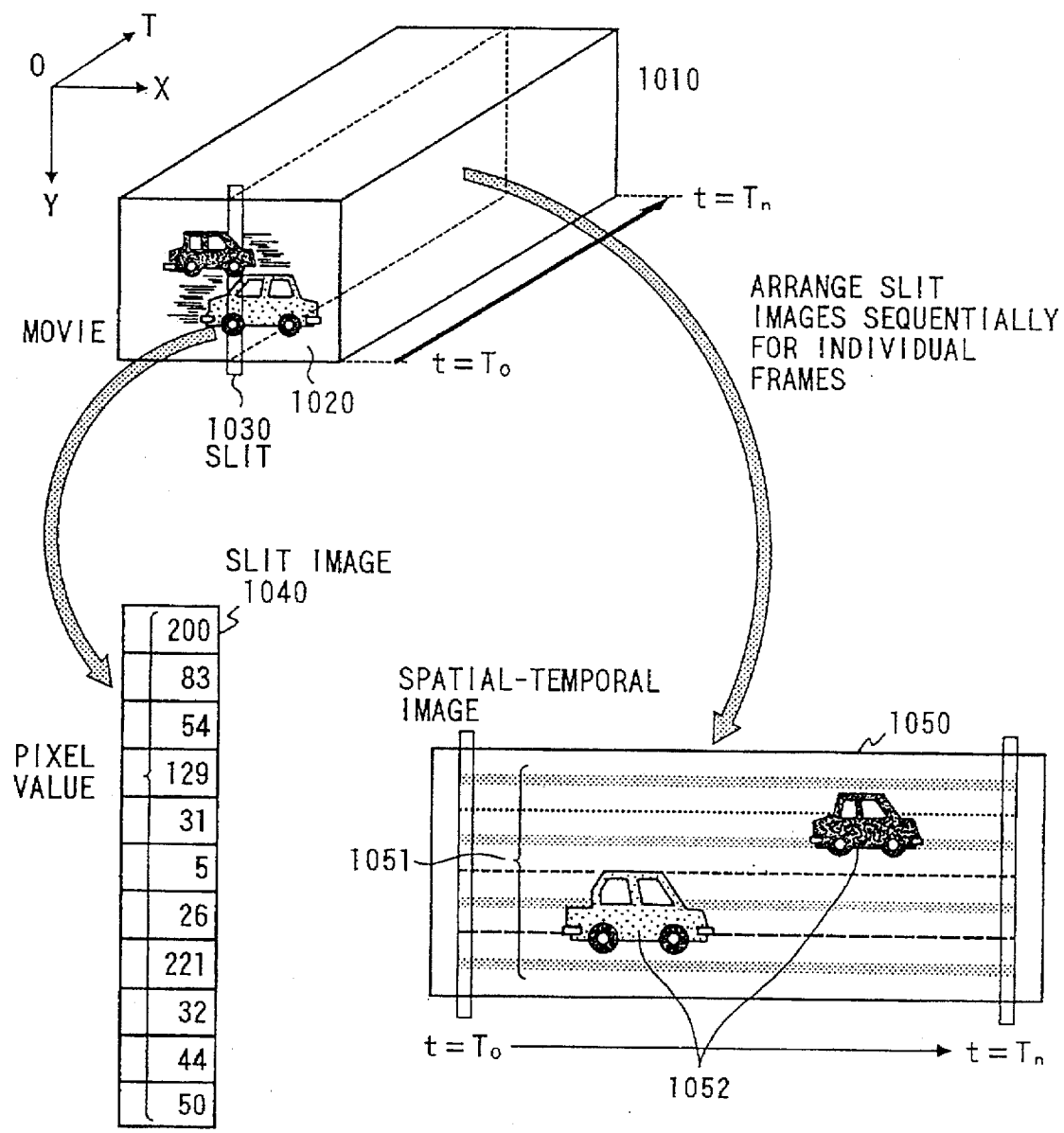
FIG. 3 shows relations among a movie, a slit image and a spatial-temporal image.

First of all, the method of judging the moving object and whether or not the structure changes in the background will be summarized with reference to FIGS. 3 to 5. Next, the background judgment means for realizing the method will be described with reference to FIGS. 6 to 12.

FIG. 3 shows the relations among the movie, the slit image and the spatial-temporal image. The movie (or motion picture) is constructed of a sequence of twenty five to thirty still images called the frame images per second. This sequence is schematically shown as a movie 1010. In this case, the movie 1010 is an arrangement of frame images from time T0 to time Tn. A slit image 1040 is a collection of the pixels which are contained in a segment called the slit 1030, from a frame image 1020. The arrangement of these slit images 1040 in the chronological order for each frame is called the spatial-temporal image 1050. This is because the spatial-temporal image 1050 contains both the temporal and spatial informations.

In the spatial-temporal image 1050 of a fixed camera, the pixel having no temporal intensity change forms the line which flows horizontally in the temporal direction, as indicated by 1051. This pixel having no temporal intensity change can be considered as belonging to the background. On the other hand, the horizontal line may break even in the background. This is because the intensity of the pixel even in the background is changed with the illuminance change such as the sunshine condition and the movement of an object constructing the background.

On the contrary, an object moving in the frame image appears as an image, as indicated by 1052, and usually forms no horizontal line. The moving object forms a horizontal line only when it stands still on the slit or when the slit is placed horizontally of the moving direction. This can be included in the aforementioned case in which the object forming the background changes.

Thus in the spatial-temporal image 1050, the background changes into the horizontal line 1051, and the others change into the images 1052. The reason for these changes 1052 is thought to come from moving object or the background change. In the invention, whether or not it belongs to the background is judged on the basis of the characteristic of the spatial-temporal image 1050 to detect/extract the moving object.

FIG. 5 shows the relation in the distance between the slit image of the background period and the current slit at each time. First of all, the slit image 1040 is extracted from the interval of the spatial-temporal image 1050, in which the moving object and the background do not change, and is set as a background slit β 1041. Next, the slit image 1040 is extracted from other times and set as a current slit τ 1042. Here is considered the slit vector, in which the intensities of the individual pixels composing the slit image 1040 are set as the vector elements, and a distance δ between two slit vectors, as given by formula 1060, is considered. If the distance δ is determined for each current slit τ 1042 at each time for the spatial-temporal image 1050, there can be obtained a graph given by a distance sequence 1070 in which the distances δ are arranged in the chronological order.

The following facts can be derived from the characteristics of the distance sequence 1070 and the spatial-temporal image 1050, as described with reference to FIG. 3. The flat portion of the distance sequence 1070, which has a constant or more length, is predicted to belong to the background so that it has no moving object. In the other portions having more changes, on the other hand, it is thought that the moving object has passed or that the background has changed. In order to discriminate these in the following description, of the distance sequence 1070, the flat portion having the constant or more length is defined as a background period 1071, and the remaining portions are defined as a moving object period 1072.

Figure 5A:
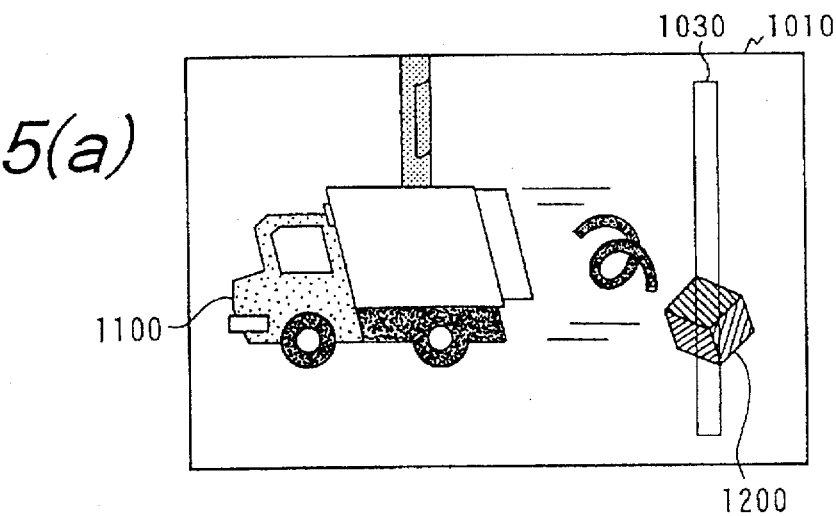
FIGS. 5(a) through 5(c) show a spatial-temporal image 1050 and a sequence of distances when a structure change occurs in the background.
Figure 5B:
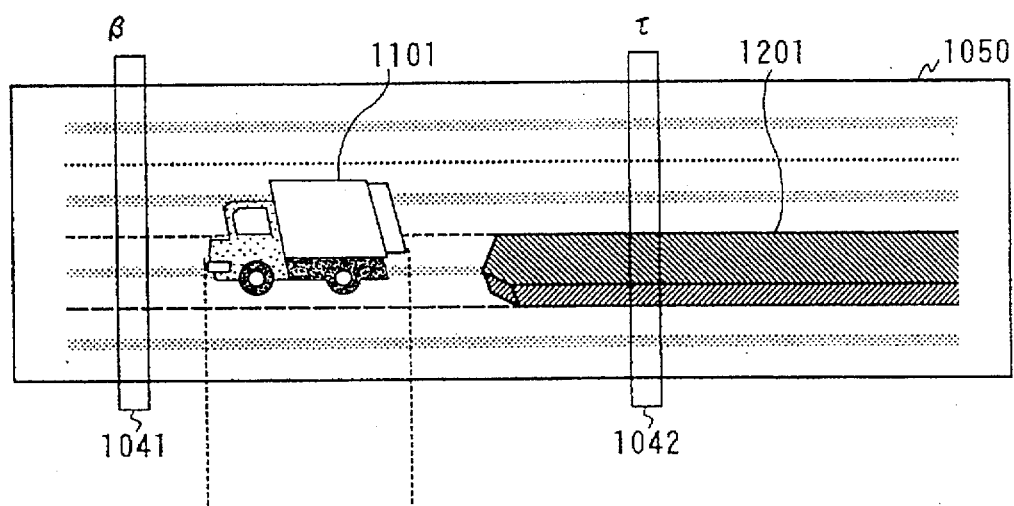

FIG. 5 shows the spatial-temporal image 1050 and the distance sequence 1070 when the structure change of the background occurs. Here is considered the case in which a moving object 1100 drops a falling object 1200 onto the slit 1030, as shown in the movie 1010 of FIG. 5(a). In this case, the background structure is changed with the falling object 1200 so that the spatial-temporal image 1050 is taken, as shown in FIG. 5(b). Specifically, the image 1201 of the falling object 1200 appears just behind the image 1101 on the spatial-temporal image of the moving object 1100. This image 1201 forms part of the background on its way so that it becomes a horizontal line, as shown in FIG. 5(b).

Figure 5C:
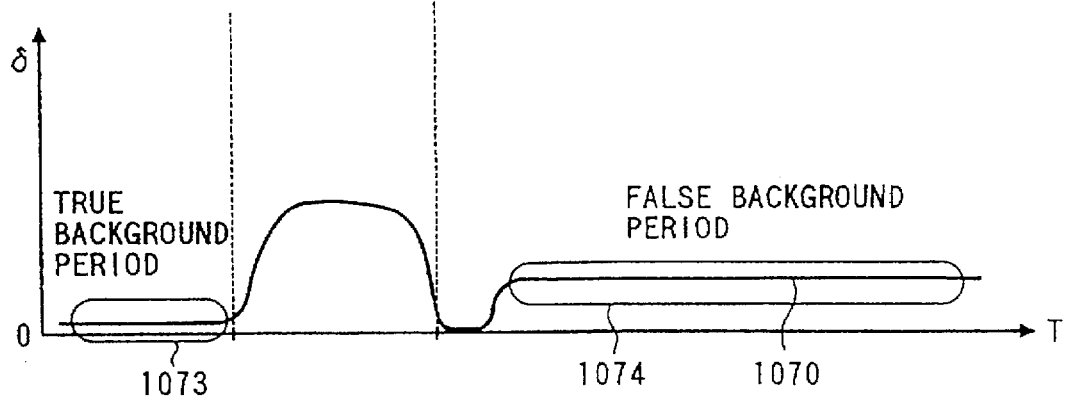

For this spatial-temporal image 1050, the distance sequence 1070 is determined, as shown in FIG. 5(c), by using the background slit β 1041. Of this distance sequence 1070, both a background period 1073 and a background period 1074 are such flat portions of the distance sequence 1070 as have a constant or more length, so that they belong to the background period 1071. In the period of the same slit as that of the background slit β 1041, the average value is substantially zero, as at the background period 1073. On the other hand, the background period 1074 takes a constant or more average value if the slit is made different from the background slit β 1041 by the image 1201 of the falling object. This is because the image 1201 of the falling object is detected as the difference from the background slit β 1041. Even for the same background period 1071, the average value of the distance sequence differs depending upon whether or not the slit image is identical to the background slit β 1041. Therefore, the individual background periods 1071 will be defined as the true background period 1073 and the false background period 1074 so that they may be differentiated.

The reason for causing the false background period 1074 is thought to come from not only the structure change of the background but also an abrupt illuminance change. For either reason, the occurrence of the false background period 1074 means that the background has changed. In order to continue the judgment of the background or the moving object, the slit τ 1042 may be updated as a new background from the false background period 1074 to repeat the judgments by the distance sequence 1070.

On the basis of the characteristics described above, the invention separates the intervals of the background and the moving object by deeming the flat period of a constant length in the distance sequence 1070 as the background period 1071 and the remainder as the moving object period 1072. Of the background periods 1071, moreover, one having an average value approximate to zero is classified as the true background period 1073 whereas the other is classified as the false background period 1074. In the case of the false background period 1074, assuming that the background has been changed with the illuminance change or the structure change, the slit image τ 1042 of the false background period 1074 is updated as a new background, and the foregoing judging procedures are repeated. By these procedures, there is realized the method of judging the presence of the moving object and the structure change of the background by discriminating the three items: the moving object, the background and the structure change of the background at all times.

Figure 6:
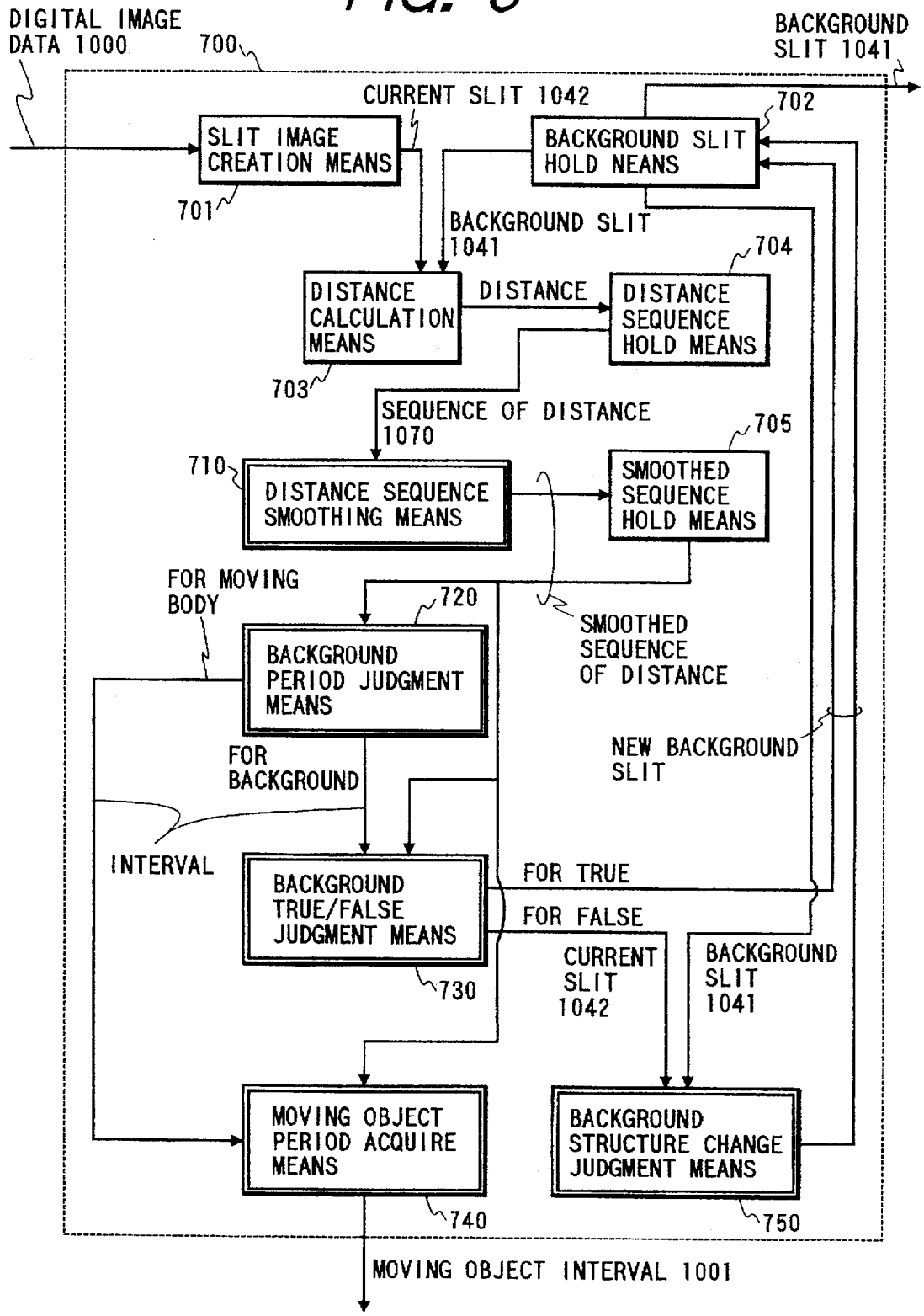
FIG. 6 explains a data flow of background Judgment means 700.

FIG. 6 explains the data flow of the background judgment means 700 for realizing the aforementioned method. This background judgment means 700 includes slit image creation means 701, background slit hold means 702, distance calculation means 703, distance sequence hold means 704, distance sequence smoothing means 710, smoothed time sequence hold means 705, background period judgment means 720, background true/false judgment means 730, moving object period acquire means 740 and background structure change judgment means 750.

The slit image creation means 701 creates the current slit 1042 to be judged on the basis of the digital image data 1000 inputted, and transmits it to the distance calculation means 703.

The background slit hold means 702 holds the background slit 1041, which is judged by the background true/false judgment means 730 or the background structure change judgment means 750, and transmits it in response to the demand from the distance calculation means 702.

The distance calculation means 702 calculates the distance in accordance with the formula 1060 by assuming the current slit 1042 and the background slit 1041 as vectors. The distance $\delta$ calculated is transmitted to the distance sequence hold means 704.

This distance sequence hold means 704 holds the calculated distance $\delta$ over a past constant time period so that the distance $\delta$ may be handled as a sequence. The distance sequence 1070 is updated to discard the oldest value and contain the newest value each time the distance is newly transmitted. Moreover, the distance sequence hold means 704 transmits the distance sequence 1070 to the distance sequence smoothing means 710 in response to a demand from the distance sequence smoothing-means 710.

This distance sequence smoothing means 710 smoothes the distance sequence 1070 which is stored in the distance sequence hold means 704, by the motion averaging method. This is because small vibrations are frequently caused in the distance sequence by the influences such as jitters. The distance sequence 1070 thus smoothed is transmitted to the smoothed sequence hold means 705.

This smoothed-sequence hold means 705 holds the smoothed latest distance sequence. This distance sequence is transmitted to the background period judgment means 720, the background true/false judgment means 730 and the moving object period acquire means 740 in response to their individual demands.

The background period judgment means 720 searches the background period 1071 from the smoothed latest distance sequence 1070 and transmits the result as the interval to the background true/false judgment means 730 and the moving object period acquire means 740, respectively. This search of the background period 1071 is realized by judging the flat portion of the smoothed distance period 1070, as described with reference to FIG. 4. The search algorithm will be detailed with reference to FIG. 7.

The background true/false judgment means 730 judges whether the background period is the true one 1073 or the false one 1074, on the basis of the background period 1071 and the smoothed distance sequence 1070. After this, the current slit image 1042 is transmitted to the background slit hold means 702 and the background structure change judgment means 750 in accordance with the judgment result. In the case of the true background period 1073, the current slit image 1042 is transmitted as a new background slit 1041 to the backgrounds lit hold means 702. In the case of the false background period 1074, the current slit image 1042 is transmitted to the background structure change judgment means 750 to extract the structure change of the background. The algorithm for the true/false judgment will be detailed with reference to FIGS. 8 to 11.

The moving object period acquire means 740 determines the maximum on the basis of the interval, in which the moving object exists, and the smoothed distance sequence 1070, and returns the number of real moving objects of the period, as predicted for their existence, and the time of the maximum portion as the moving object period.

The background structure change judgment means 750 judges whether the background change is caused by the structure change or the illuminance change, from both the background slit 1041 stored in the background slit hold means 702 and the current slit image 1042 transmitted from the background period true/false judgment means 730, thereby to update the current slit image 1042 as a new background. This judgment algorithm will be detailed with reference to FIG. 12.

FIG. 7 shows the flow chart of the background period judgment means. First of all, the smoothed sequence 1070 for a constant interval (e.g., the latest forty five frames) is acquired (at Step 2001) from the smoothed sequence hold means 705. Next, the maximum/minimum for the interval are acquired (at Step 2002) from the smoothed sequence 1070. If the difference between the maximum and the minimum is over a predetermined threshold, it is judged that the period is not the background period 1071, and the procedure is ended. If the difference is below the threshold, it is judged that the period is the background period 1071, and the routine advances to Step 2004 (at Step 2003). At last, the leading and ending times of the sequence are returned as the interval (at Step 2004).

Figure 8A:
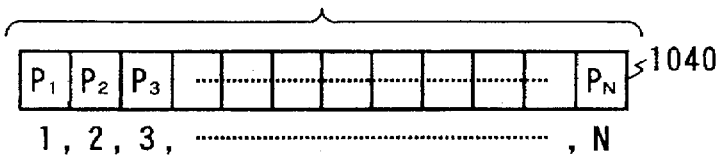
FIGS. 8(a) through 8(c) show the influences of an illuminance change upon a slit image 1040.
Figure 8B:
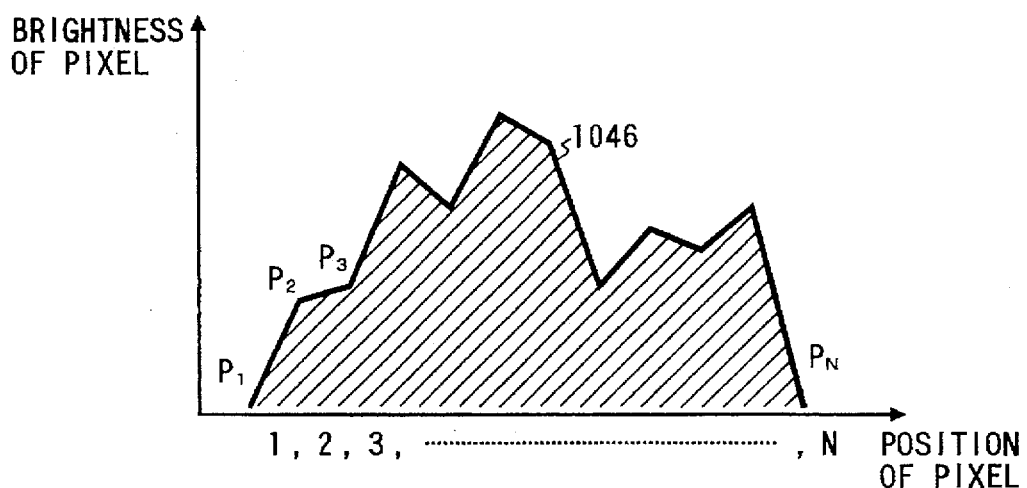

FIG. 8 shows the influences of the illuminance change upon the slit image. First of all, there is thought the slit 1040 in which the brightnesses of the individual pixels are given by $P_1$ to $P_n$, as shown in FIG. 8(a). Next, a graph is drawn to take the positions of pixels on the abscissa and the brightnesses of pixels on the ordinate, as indicated by 1046 in FIG. 8(b).

Figure 8C:
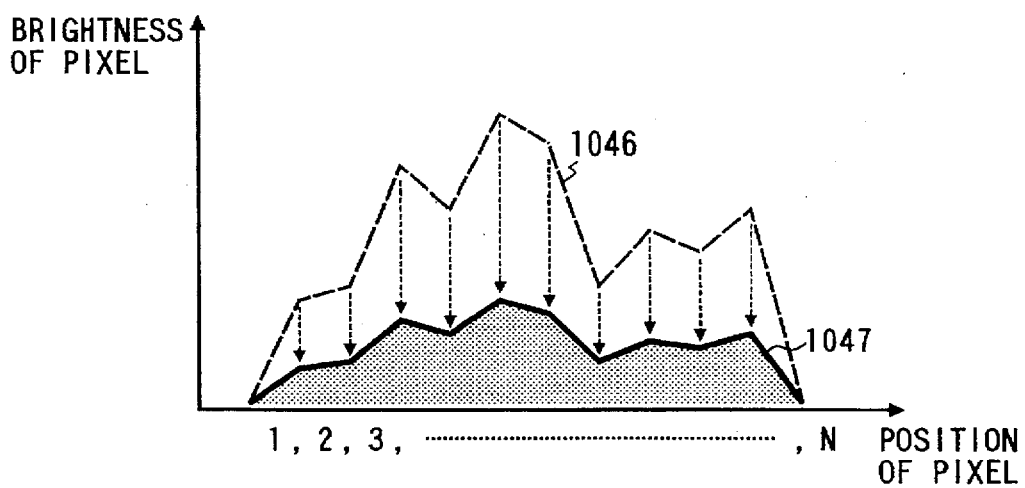

If an abrupt illuminance change occurs to darken the slit image 1040 as a whole, the brightnesses of the individual pixels $P_1$ to $P_n$ in the slit image 1040 grow uniformly dark from 1046 to 1047 while holding the relations, as shown in FIG. 8(c). These illuminance changes are shown in FIG. 9 if the slit image is deemed as vectors.

It can be deemed that the slit image 1040 be a vector v 1048 having the individual pixel brightnesses as its elements, as shown in FIG. 9(a). If the base vectors of the individual pixels $P_1$ to Pn are designated by $b_1, b_2, b_3, - - -, b_n$, the vector v 1048 can be expressed as one point in an n-dimensional vector space, as shown in FIG. 9(b). Next, it is assumed that an abrupt illuminance change occurs for that vector v 1048 so that the slit vector changes into a slit vector v 1049, as shown in FIG. 9(c). At this time, it can be deemed from the consideration of FIG. 8 that the changed slit vector v' 1049 exists on a straight line substantially identical to that of the vector v 1048 and is scalar times as large as the vector v 1048.

Thus, it can be understood that the original slit vector 1048 and the slit vector 1049 changed by the illuminance have substantially identical directions even if they have highly different coordinate positions in the vector space. On the other hand, the slit vector having a changed structure is predicted to be highly different not only in the coordinate position but also in the direction. In order to discriminate the illuminance change and the structure change of the slit 1040, therefore, it is sufficient to consider the direction.

Figure 10:
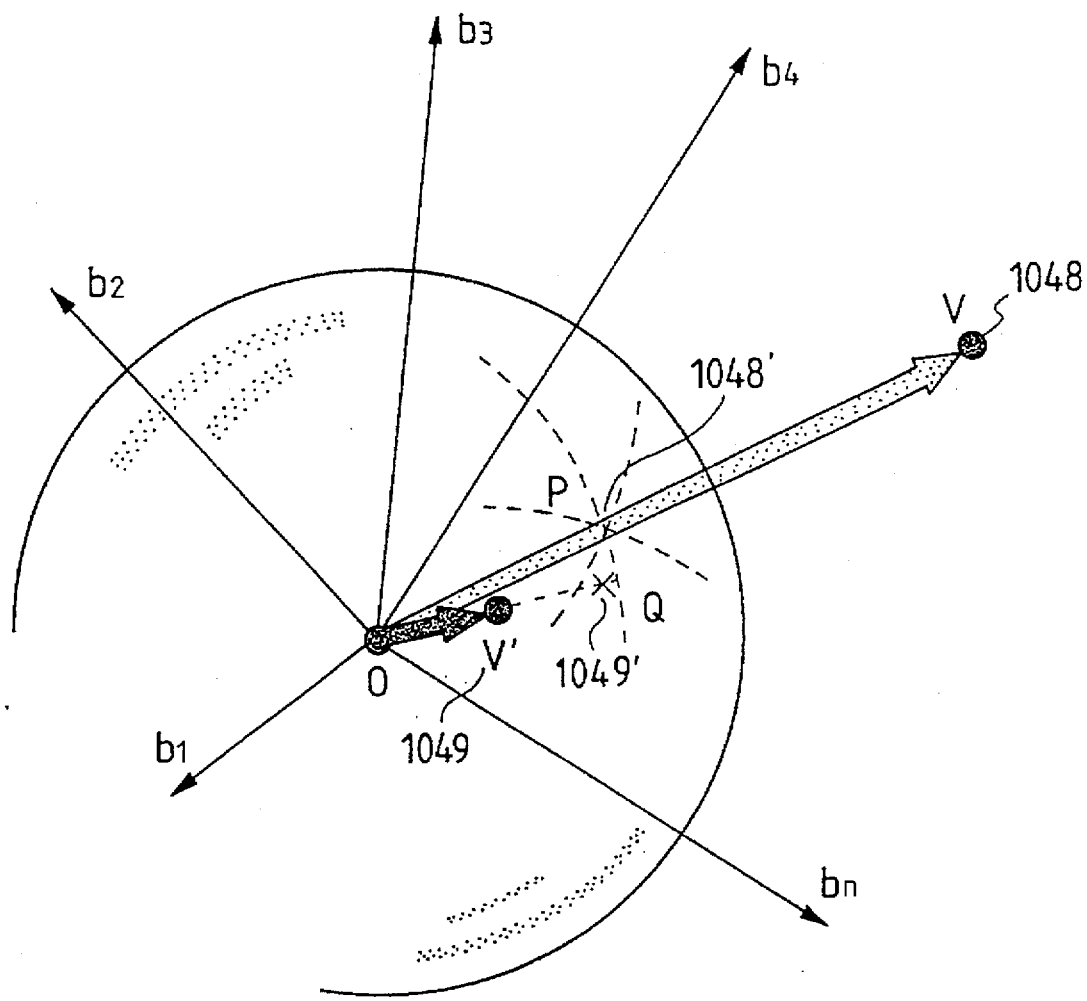
FIG. 10 shows the mapping of the ordinary slit vector and the slit vector, as influenced by the illuminance change, upon a unit sphere.

FIG. 10 is the projections of the ordinary slit vector 1048 and the slit vector 1049 which is influenced by the illuminance change, upon a unit sphere. As shown in FIG. 10, the distance PQ between the projected vector P 1048' of the vector v 1048 upon the unit sphere and the projected vector Q 1049' of the vector v 1049 upon the unit sphere becomes far shorter than the original distance vv'. Whether the relation between the two different slit images is caused merely by the difference in the illuminance change or the structure change can be judged depending upon whether or not the vector distance on the unit sphere is extremely short. This normalized intervector distance will be called the normalized distance so that it may be discriminated from the distance, as defined by the formula 1060.

In the invention, this normalized distance is utilized to discriminate whether the background change is caused by the structure change or the illuminance change.

Figure 11:
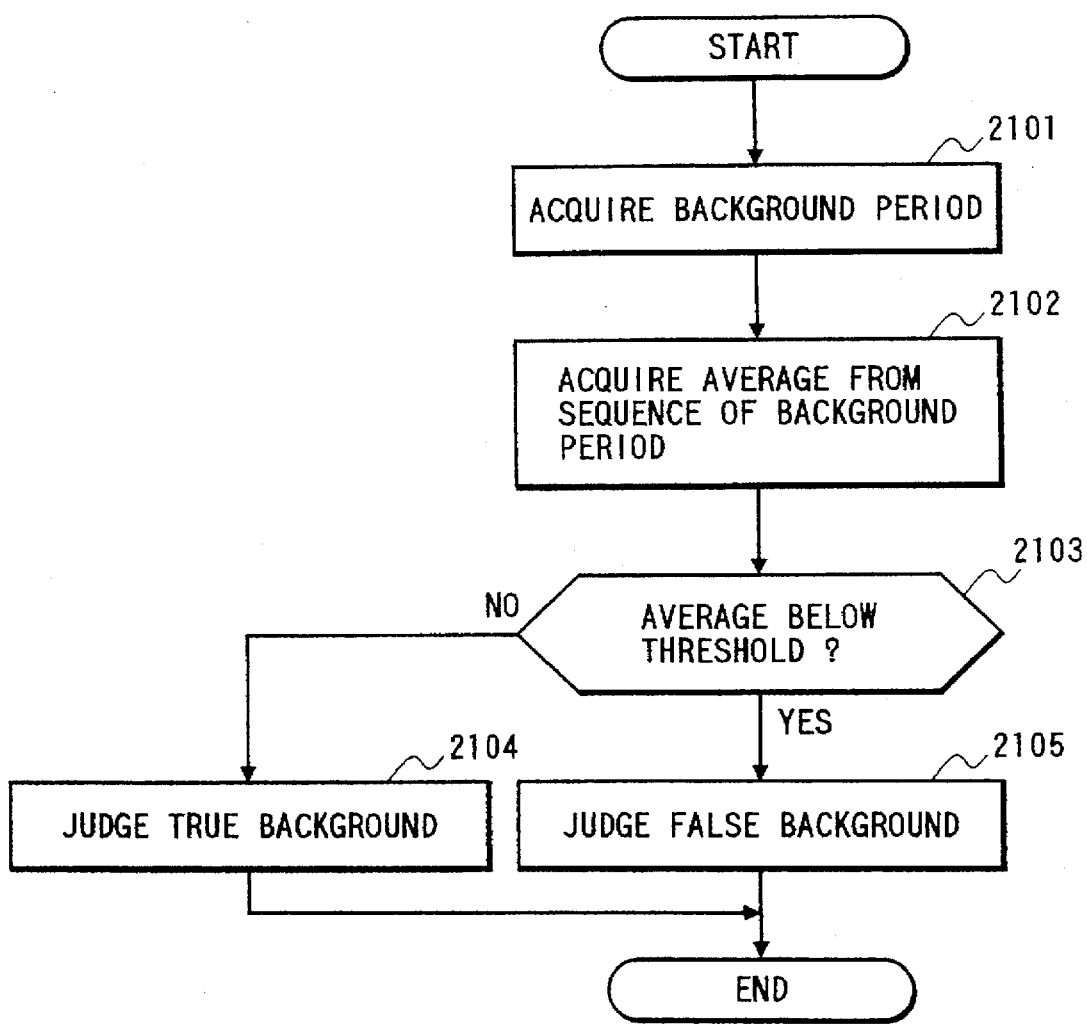
FIG. 11 shows a flow chart of background true/false judgment means 730.

FIG. 11 shows the flow chart of the background true/false judgment means 730. First of all, the background period 1071 is acquired (at Step 2101) from the background period judgment means 720. Next, an average value is acquired (at Step 2102) from the smoothed sequence of the background period 1071. If the average value is below a predetermined threshold, the given background period 1071 is judged to be the true background period 1073, and the routine advances to Step 2104. If the average is over the threshold, the background period is judged to be false (at Step 2103), as at 1074, and the routine advances to Step 2105. If at Step 2104, the background period 1071 is true, as at 1073, and the routine is ended (at Step 2105) by storing the latest slit as the new background slit 1041 in the background slit hold means 702. If at Step 2105, the background period 1071 is false, as at 1074, and the routine is ended (at Step 2105) by judging whether it is due to the illuminance change or the structure change, by the background structure judgment means 705.

Figure 12:
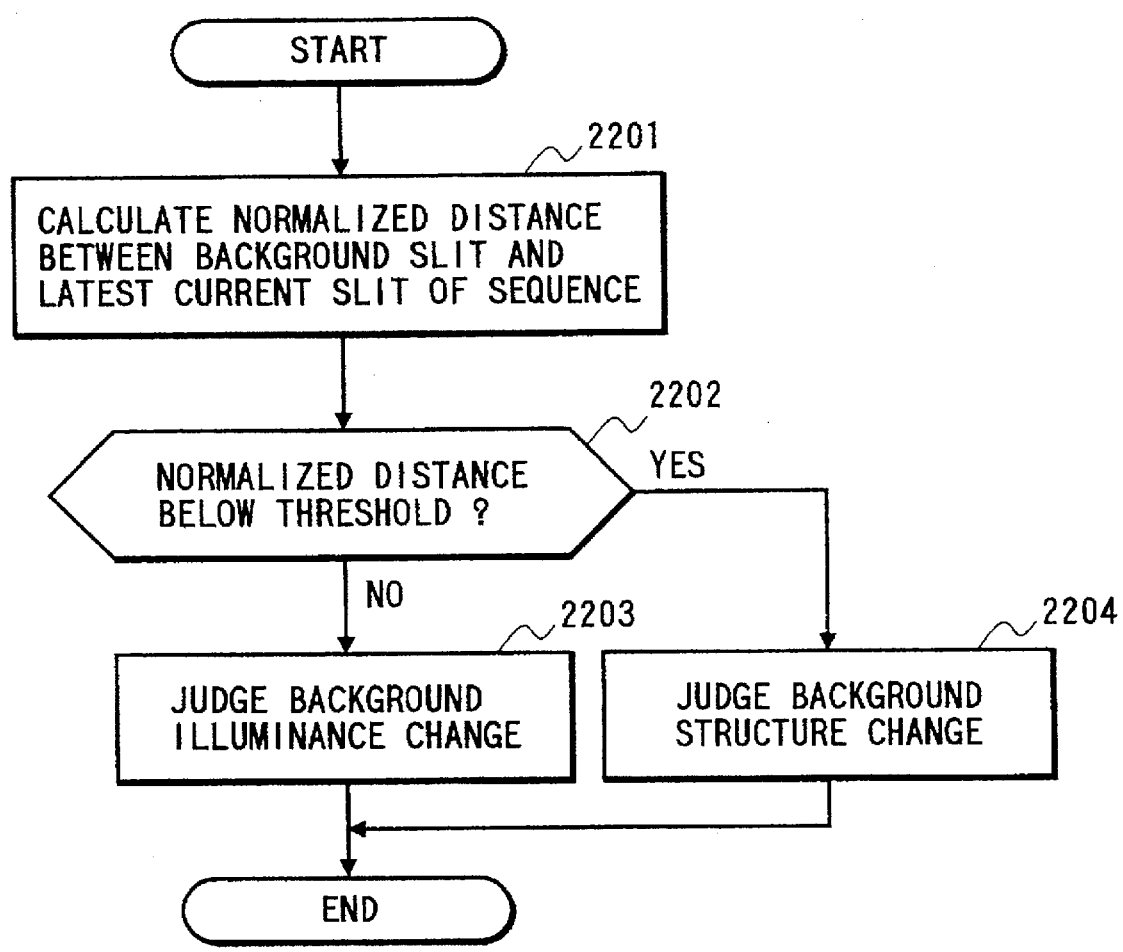
FIG. 12 shows a flow chart of background structure change judgment means 750.

FIG. 12 shows the flow chart of the background structure change judgment means 750. First of all, in order to judge whether the judgment of the false background period 1074 is caused by the illuminance change, the normalized distance between the background slit 1041 and the latest current slit 1042 in the smoothed sequence is determined (at Step 2201). If this normalized distance is below a predetermined threshold, this judgment is caused by the illuminance change, and the routine advances to Step 2203. If over the threshold, the decision is caused (at Step 2202) by the structure change, and the routine advances to Step 2204.

In the case of Step 2203, the background period 1071 is the false background period 1074 due to the illuminance change. The routine is ended by setting the value in the smoothed sequence to zero and by storing the current slit 1042 as the new background slit 1041 in the background slit hold means 702. In the case of Step 2204, the background period 1071 is the false background period 1074 due to the structure change. In this case, the routine is ended by storing the latest current slit 1042 as the new background slit 1041 in the background slit hold means 702 and by setting all values in the smoothed sequence to zero.

Figure 13:
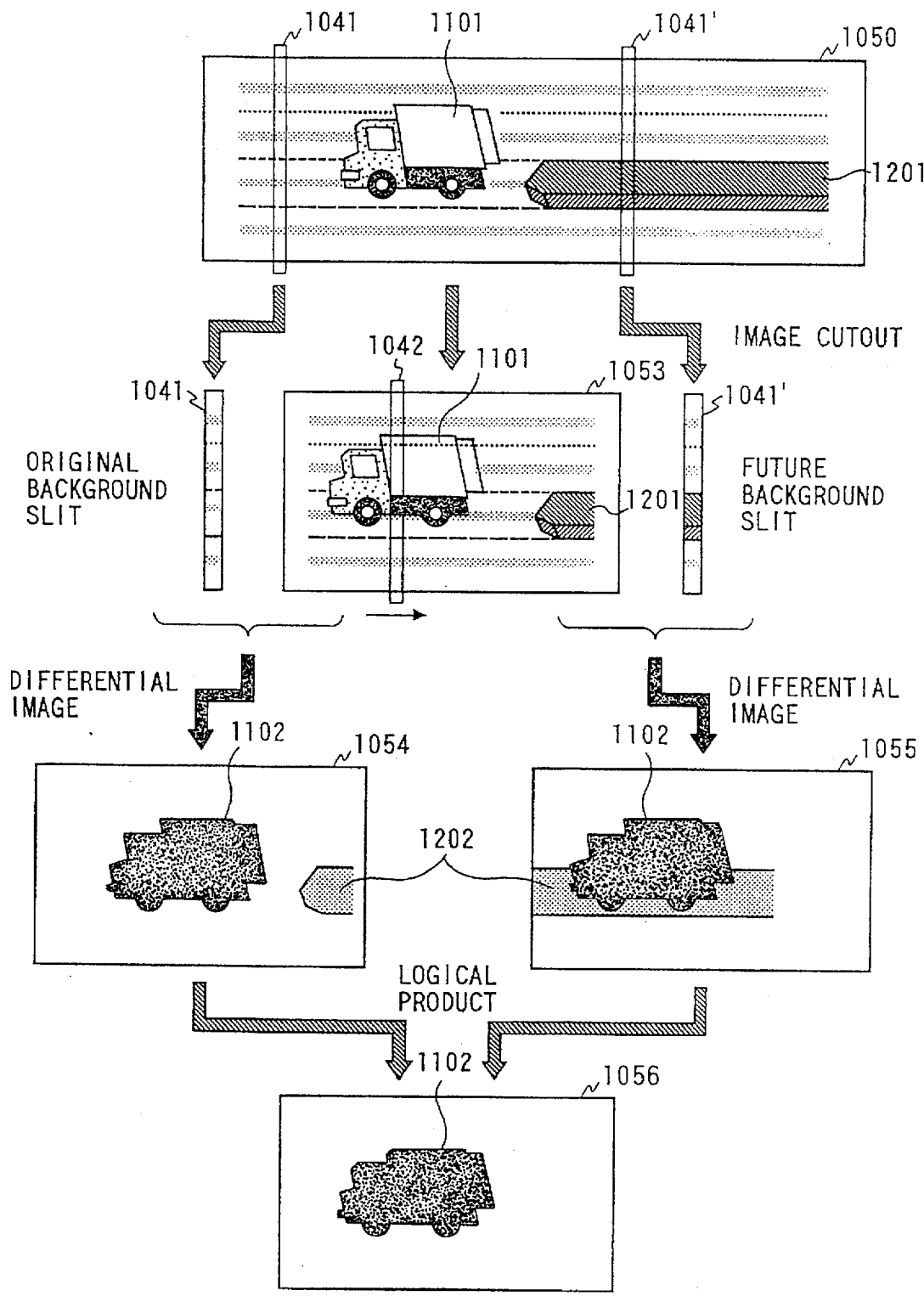
FIG. 13 shows the summary of a method of extracting a moving object 1100 exclusively by separating/judging a background change portion and a moving object region from a spatial-temporal image 1050.

Next, the method of extracting the moving object exclusively and the method of calculating the moving direction and velocity will be described in the following. FIG. 13 summarizes the method of extracting the moving object exclusively by separating/judging the background change region and the moving object region from the spatial-temporal image. FIGS. 14 and 15 summarize the method of calculating the moving direction and velocity. FIGS. 15 to 19 explain %he motion analysis means for realizing those methods.

FIG. 13 summarizes the method of extracting the moving object exclusively by separating/judging the background change region and the moving object region from the spatial-temporal image 1050.

First of all, a spatial-temporal image 1053 in the interval where the moving object is thought to exist is cut out of the spatial-temporal image 1050 on the basis of the moving object interval 1001, and the original background slit 1041 and a future background slit 1041' are acquired. Next, an original background differential image 1054 is created from the original background slit 1041 and the spatial-temporal image 1053, and a future background differential image 1055 is created from the future background slit 1041' and the spatial-temporal image 1053. This background differential image contains not only a moving object region 1102 but also the differential region 1202 between the background slit 1041 and the background structure change.

At last, the logical product of the original background differential image 1054 and the future background differential image 1055 is determined to extract the moving object region 1102. As a result, the differential region 1202 from the background structure change is canceled so that only the moving object region 1102 or the common region can be extracted.

FIG. 14 summarizes the slit setting method for analyzing the motions of the moving object in the movie and the method of calculating the moving direction/velocity 1003 of the moving object 1101 which is extracted from the spatial-temporal image 1050 obtained by the slit setting method.

Generally speaking, if the slit 1030 is set at a right angle or at a non-parallel oblique direction with respect to the moving direction of the moving object, the moving object 1101 is inclined forward or backward in the spatial-temporal image 1050 thus obtained, as shown in FIG. 14. This is because the upper or lower side of the moving object 1101 reaches the slit 1030 faster than the opposite side with respect to the slit 1030. As a result, even with a single slit, it can be determined from the positive or negative sign of the inclination whether the moving object has moved from the left or right hand. From the magnitude of the inclination 1210, moreover, the average velocity to cross the slit 1030 can be calculated.

By utilizing this, the moving direction/velocity 1003 of the moving object 1101 can be calculated according to the invention. In the motion analysis means 800, the moving object region 1201 is extracted from the spatial-temporal image 1050 which is obtained from the slit 1030 set at the inclination, and this inclination 1210 is calculated from the moment of the region to estimate the moving direction and velocity.

FIG. 15 explains the principle for calculating the moving direction/velocity 1003 of the moving object 1101 extracted, from the inclination of the slit 1030 and the inclination 1210 of the moving object 1011.

First of all, the inclination of the slit 1030, as set on the movie 1010, from the horizontal direction is designated by α. It is assumed that the moving object 1100 having a horizontal velocity v passes the slit 1030. If the moving object 1100 has a height h and if the moving object 1100 moves by w after its upper portion passed the slit and before its lower portion passes the slit, the horizontal moving velocity v is expressed by a formula 1610. Next, the inclination of the image 1101 of the moving object in the spatial-temporal image 1050 is expressed by θ. If the number of frame images per second is f, the frame number s for the moving object to move by w in the frame image is described by a formula 1620. A formula 1630 is obtained if the formulas 1610 and 1620 are rearranged for v. The positive and negative signs of v indicate the directions, and the absolute value indicates the magnitude of the horizontal velocity component.

In the invention, on the basis described above, the moving direction/velocity 1003 are calculated from the inclination of the slit 1030 and the inclination of the image 1101 of the moving object 1100 in the spatial-temporal image 1050.

Figure 16:
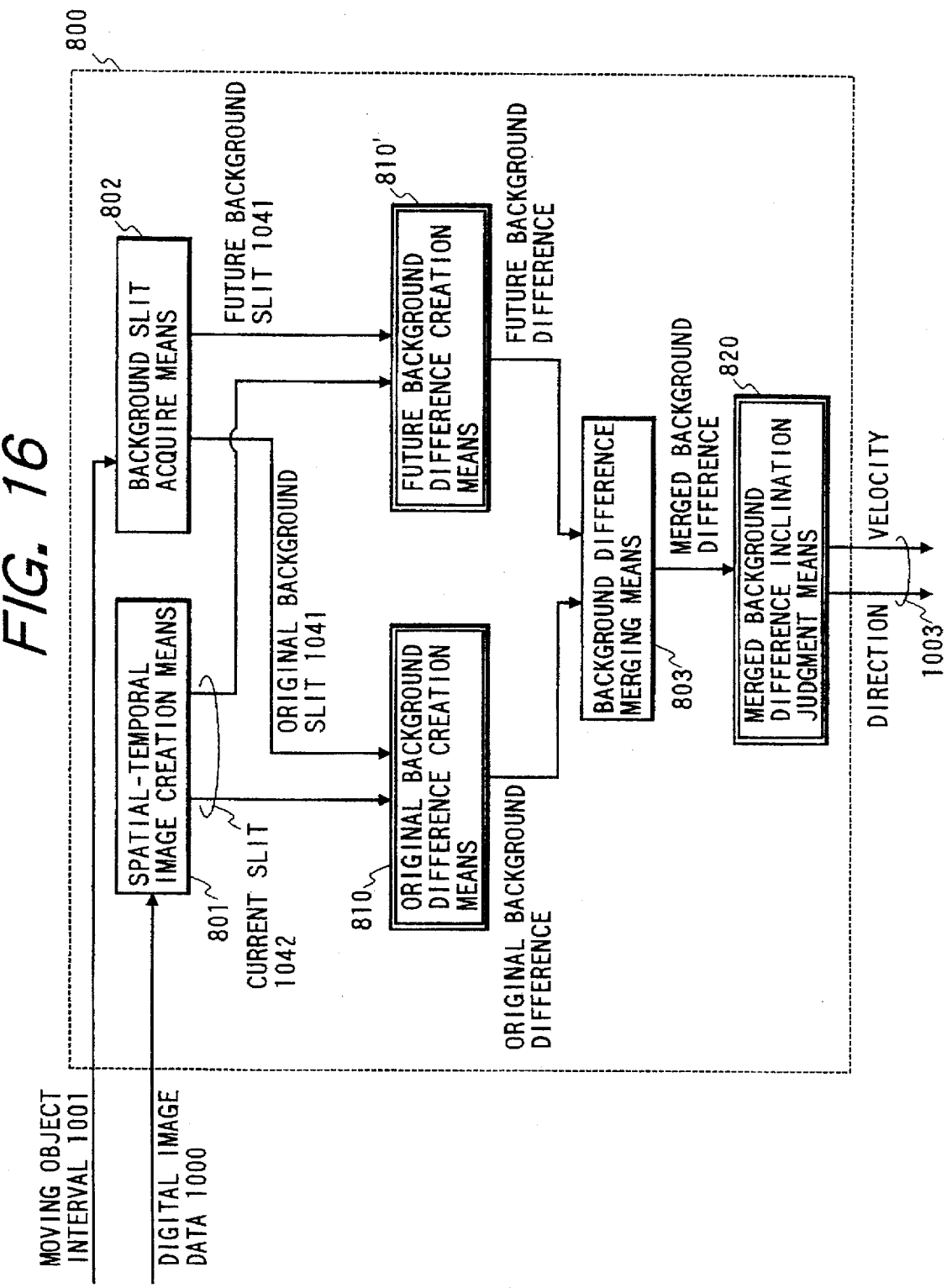
FIG. 16 shows a data flow of motion analysis means 800 for realizing the aforementioned method.

FIG. 16 shows the data flow of the motion analysis means 800 for realizing the aforementioned method. This motion analysis means 800 includes spatial—temporal image creation means 801, background slit acquire means 802, background difference merging means 803 and merged background difference inclination judgment means 820.

These spatial-temporal image creation means 801, background slit acquire means 802, background difference merging means 803 and merged background difference inclination judgment means 820 realize the method of extracting the moving object 1101 exclusively by separating/judging the background change region 1202 and the moving object region 1102 from the spatial-temporal image 1050, as described with reference to FIG. 13.

The spatial-temporal image creation means 801 creates the spatial-temporal image 1053 in the interval, for which the moving object 1101 exists, by acquiring the slit images from the digital image data 1000 and the moving object interval 1001 and by arranging them in the frame order. The spatial-temporal image 1050 is transmitted in response to the demands from the background difference creation means 810 and 810'.

The background slit acquire means 802 acquires the original background slit 1041 and the future background slit 1041' from before and behind the interval, for which the moving object 1101 exists, on the basis of the digital image data 1000 and the moving object interval 1001.

The background difference creation means 810 and 810' creates the original background difference 1054 and the future background difference 1055 from the spatial-temporal image 1053, the original background slit 1041 and the future background slit 1041'. The detail of the background difference creation algorithm will be described with reference to FIG. 17.

The background difference merging means 803 creates a merged background difference 1056 from the logical product of the created original background difference 1054 and future background difference 1055. Only the moving object 1101 is extracted by the procedure described above.

The merged background difference inclination judgment means 820 realizes the method of calculating the moving direction/velocity 1003 of the extracted moving object from the inclination of the slit 1030 and the inclination 1210 of the moving object, as described with reference to FIGS. 13 and 14.

Figure 17:
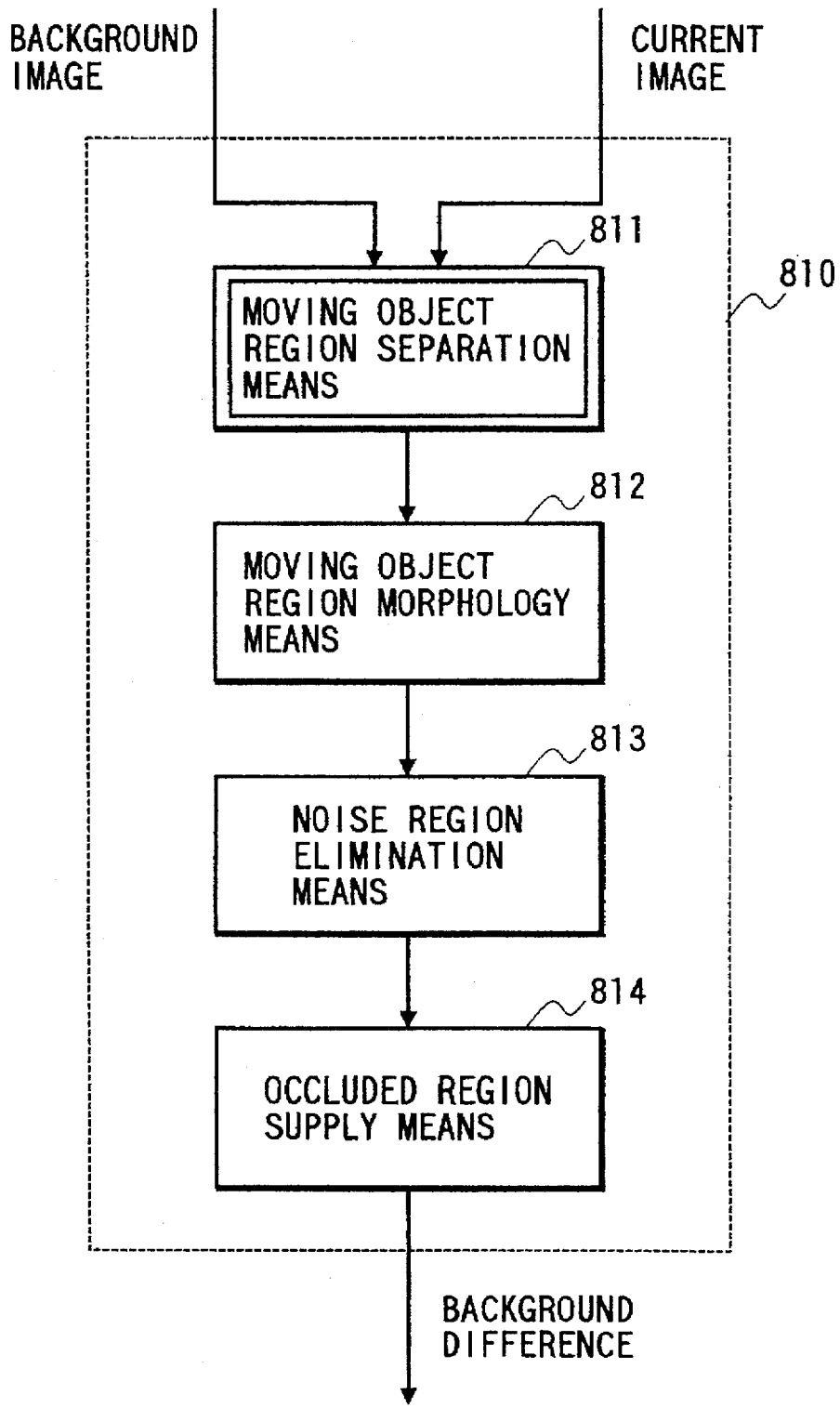
FIG. 17 shows a data flow of means 810 for creating an original background difference and a future background difference.

FIG. 17 shows the construction (or data flow) of the means 810 for creating the background difference by using the original background and the future background. The background difference creation means 810 includes moving object region separation means 811, moving object region morphology means 812, noise region elimination means 813 and occluded region supply means 814.

The moving object region separation means 811 makes only the moving object region 1201 binary to separate/extract it from either the background slit image 1041 and the current slit image 1042 or the background frame image and the current frame image. The detail of this separation/extraction algorithm will be described with reference to FIGS. 18 and 19.

Next, with the assumption that the moving object be one occluded region having a constant or more size, the moving object region morphology means 812, the noise region elimination means 813 and the occluded region supply means 814 correct the rupture or segmentation of the moving object region, as caused by moving object region separation means 911.

The moving object region morphology means 812 connects the ruptured or segmented moving object region 1201 by the morphologies. The number of these morphologies is about three. The noise region elimination means 813 eliminates the minute regions independent from the moving object region 1201 of morphology by deeming them as noises. The occluded region supply means 814 searches and smears the holes contained in the moving object region 1201.

By the processings described above, the moving object 1200 is cut out as the moving object region 1201 to create the background differential image. When the change in the background structure is to be cut out, this cutout can be made by the processings using the changed background image in place of the current image.

Figure 18:
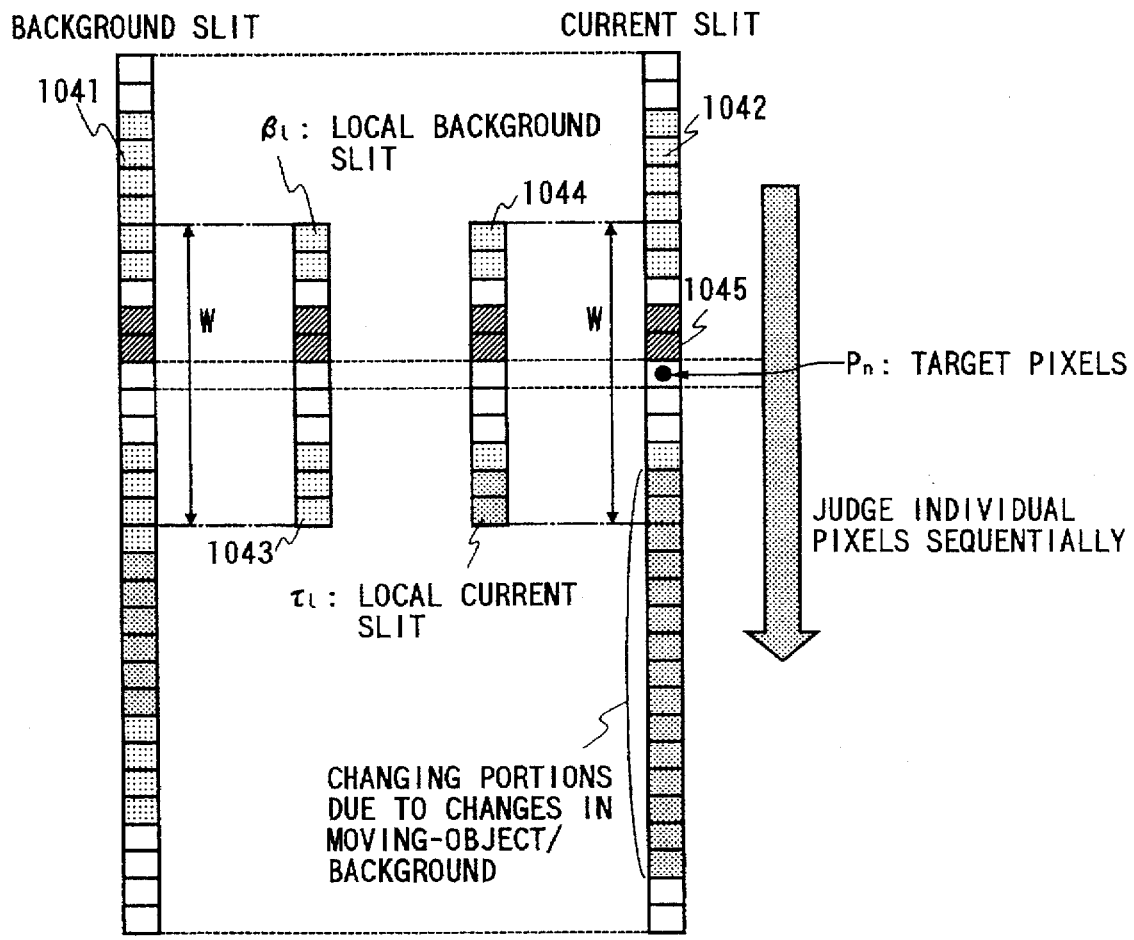
FIG. 18 shows the summary of moving object region separation means 811.

FIG. 18 summarizes the moving object region separation means 810. First of all, there are acquired the background slit 1041 and the current slit 1042 from which the moving object region is to be cut out. Next, the background slit 1041 and the current slit 1042 are compared for each pixel to judge whether they belong to the background or the moving object. This comparison does not resort to the brightness of the corresponding pixel, but a local slit composed of a w-number of pixels including the corresponding one is created for the judgment by determining the normalized distance between the local slits.

When it is judged whether a target pixel Pn 1045 belongs to the background or the moving object, for example, a local slit $\tau_1$ 1044 containing the target pixel Pn 1045 and a corresponding background local slit $\beta_1$ 1043 are created to determine the normalized distance of the two. Because this normalized distance is used, the background can be correctly judged and eliminated even if the illuminance change of its portion is caused by the shadow of the moving object or the light.

However, when the individual pixel valves of the background local slit 1043 have a small dispersion, the ordinary vector distance is used. This is because the normalized distance takes a zero value and is misjudged as the background even when a white object moves over a dark background.

Figure 19:
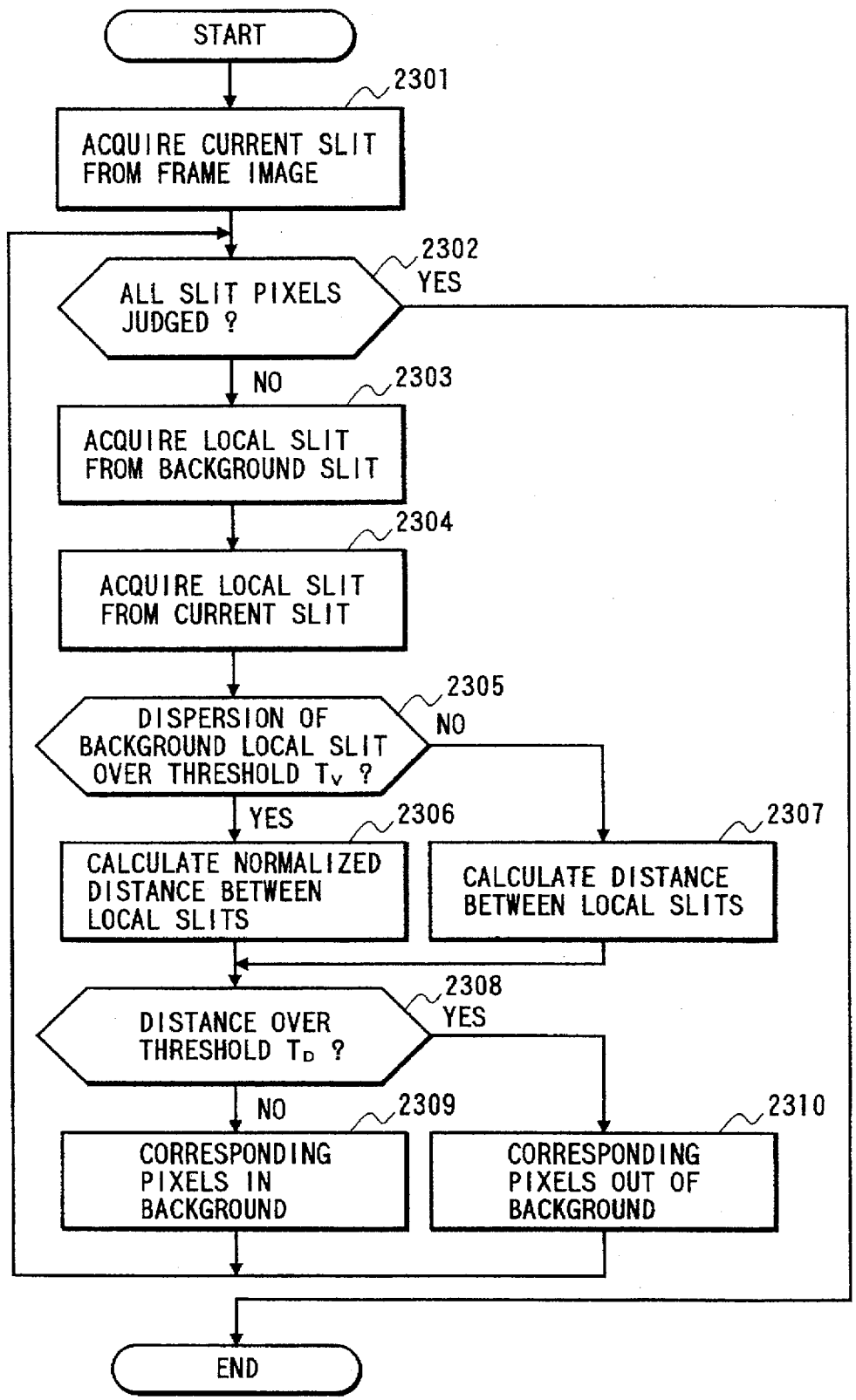
FIG. 19 shows a flow chart of the moving object region separation means.

FIG. 19 shows the flow chart of the moving object region separation means 810. First of all, the current slit 1042 to be judged is acquired from the movie 1010 (at Step 2301). Next, it is checked whether or not the judgment is executed for all slit pixels. The routine advances to Step 2303, if there is any pixel non-judged, and otherwise the routine is ended (at Step 2302). The two local slits 1043 and 1044 are acquired sequentially from above (at Steps 2303 and 2304) from the background slit 1041 and the current slit 1042. The dispersion of the background local slit 1043 is determined and is compared with the predetermined threshold TV. The routine advances to Step 2306, if below the threshold TV, and otherwise to Step 2307 (at Step 2305). Here, the normalized distance is determined (at Step 2306) as the distance between the two local slits 1043 and 1044. Here, the vector distance is determined (at Step 2307) as the distance between the two local slits 1043 and 1044. The distance between the two local slits thus determined is compared with a predetermined threshold TD. The routine advances to Step 2309, if below the threshold TD, and otherwise to Step 2310 (at Step 2308). The target pixel to be judged belongs to the background (at Step 2309), if judged below, and otherwise the target pixel belongs to the non-background (at Step 2310). The procedure described above is returned to Step 2302 and is repeated.

Figure 20:
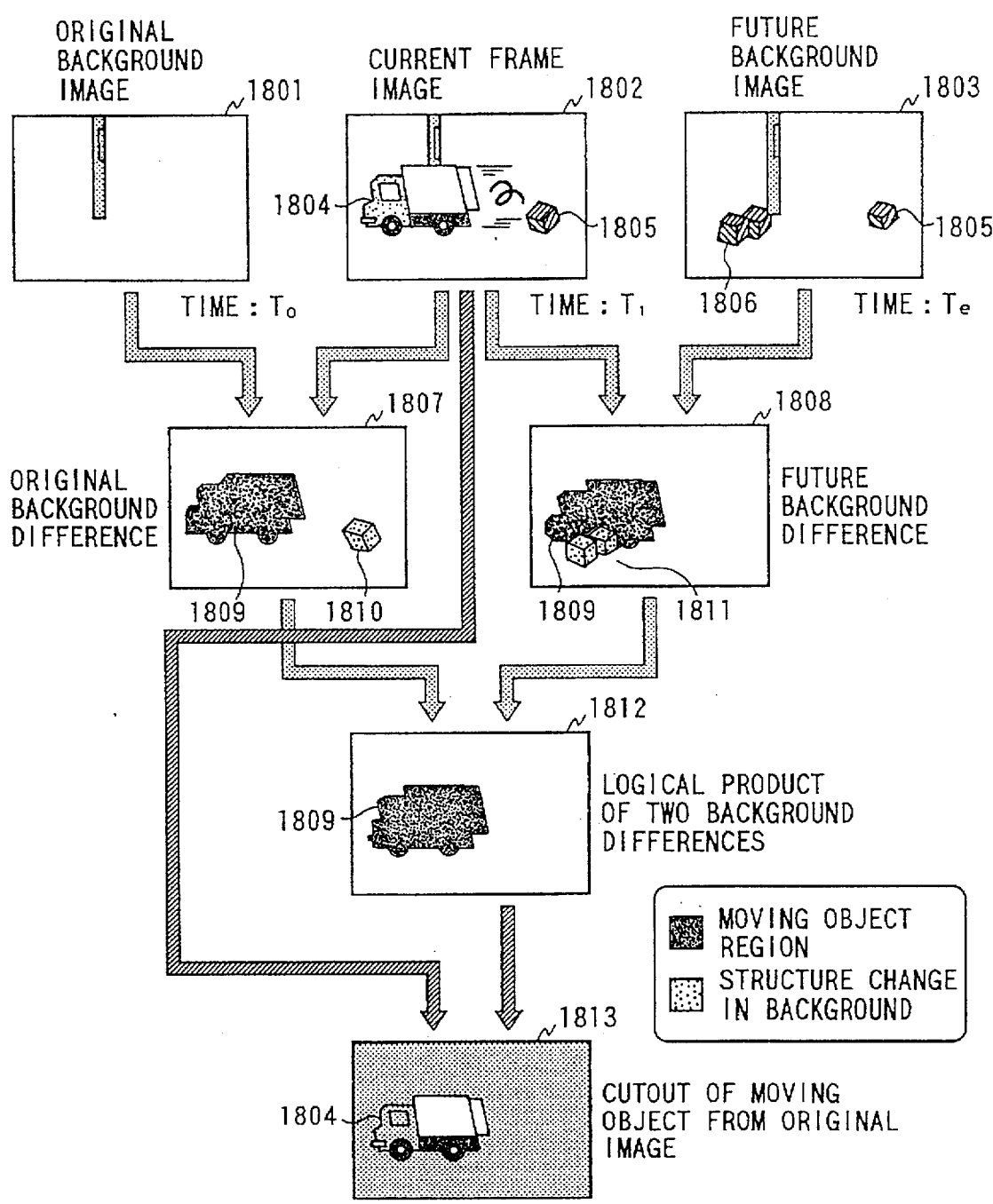
FIG. 20 shows the summary of a method of extracting a moving object exclusively by separating/judging a background change portion and the moving object region relative to a frame image.
Figure 21:
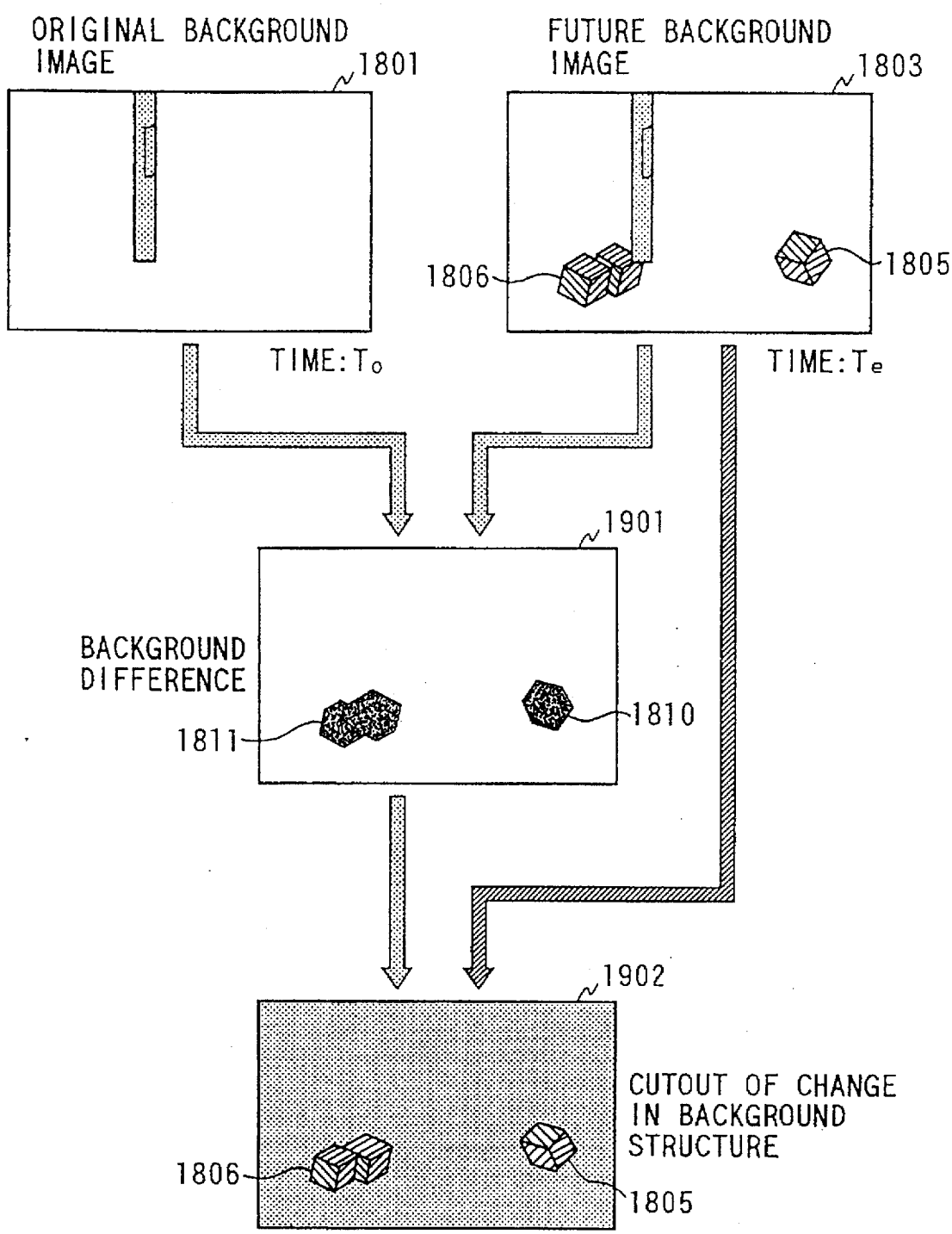
FIG. 21 shows the summary of a method of extracting the background change exclusively by separating/judging the background change portion and the moving object region with respect to the frame image.

FIGS. 20 and 21 explain the method of extracting the moving object and the background by separating/judging the background change region and the moving object region from the frame image.

FIG. 20 summarizes the method of extracting the moving object exclusively by separating/judging the background change region and the moving object region from the frame image.

First of all, an original background image 1801, a future background image 1803 and a current frame image 1802 are acquired. Here, it is assumed that a moving object 1804 and a falling object 1805 be projected on the current frame image 1802 and that another falling object 1806 be projected in addition to the falling object 1805 on the future background image 1803.

Next, there are created an original background difference 1807 between the original background image 1801 and the current frame image 1802 and a future background difference 1808 between the future background image 1803 and the present frame image 1802. A moving object region 1809 and a background change region 1810 by the falling object appear in the original background difference 1807. In the future background difference 1808, on the other hand, there appear the moving object region 1809 and a background change region 1811 by the falling object 1806.

If a merged difference 1812 of the original background difference 1807 and the future background difference 1808 is determined by the logical product, the background change regions 1810 and 1811 are deleted to leave only the moving object region 1809.

At last, when a cutout is made from the frame image 1802 by using the merged difference 1812 as the mask image, it is possible to obtain a moving object image 1813 containing only the moving object 1804.

FIG. 21 summarizes the method of extracting the background change exclusively by separating/judging the background change region and the moving object region from the frame image.

First of all, the original background image 1801 and the future background image 1803 are acquired. Here, it is assumed that the future background image 1803, the falling object 1805 and the falling object 1806 are reflected. Next, a background difference 1901 between the original background image 1801 and the future background image 1803 is created. In this background difference 1901, there appear the background change region 1810 by the falling object 1805 and the background change region 1811 by the falling object 1806. At last, when a cutout is made from the future background image 1803 by using the merged difference 1901 as the mask image, it is possible to obtain a background structure change image 1902 containing only the falling objects 1805 and 1806.

Figure 22:
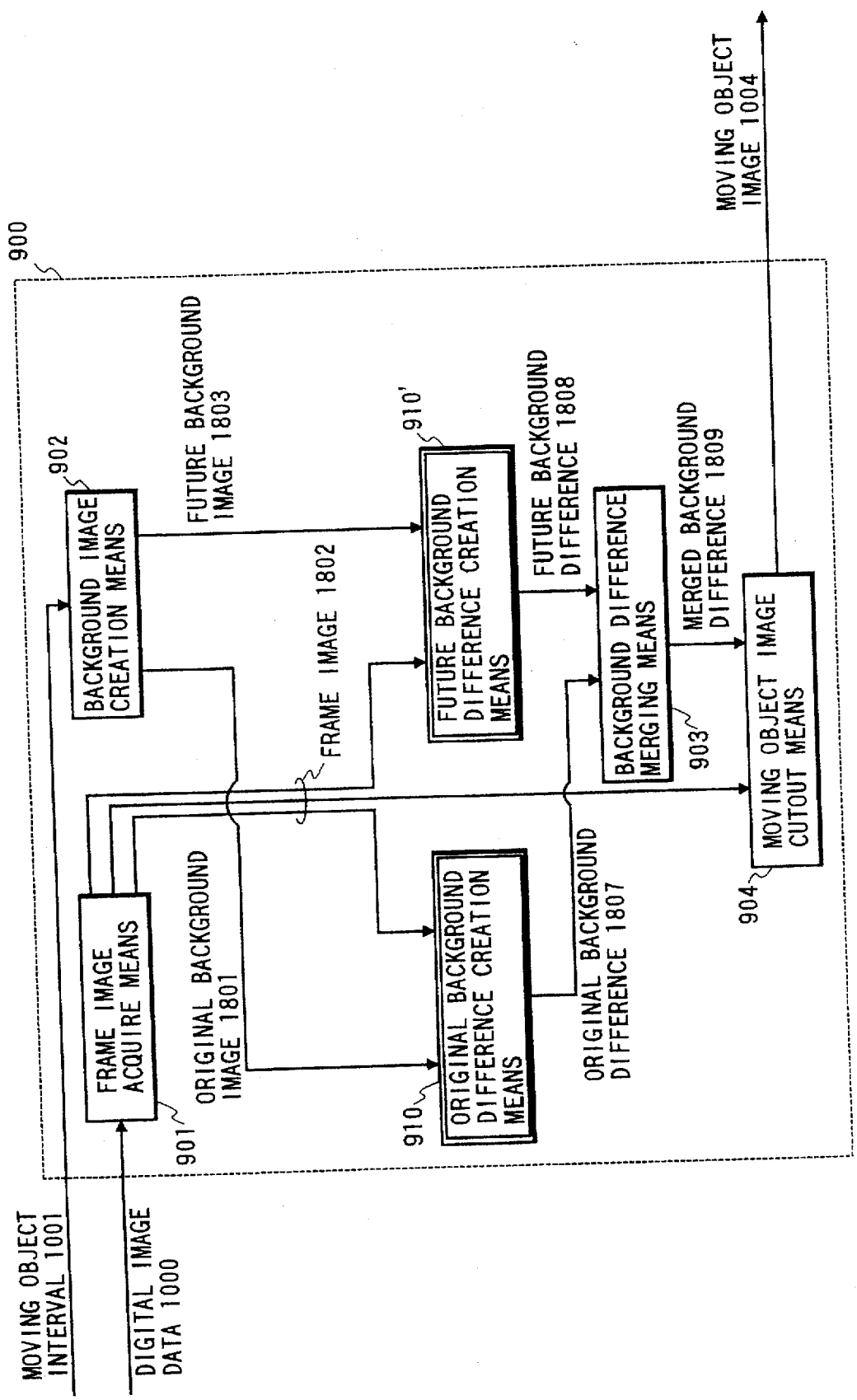
FIG. 22 shows a data flow of moving object extraction means 900 for realizing the aforementioned method.

FIG. 22 shows the construction (or data flow) of the moving object extraction means 900 for realizing the aforementioned method. The moving object extraction means 900 is constructed to include six components of frame image acquire means 901, background image creation means 902, background difference creation means 910 and 910', background difference merging means 903 and moving object cutout means 904. These means realizes the method of extracting only the moving object by separating/judging the background change region and the moving object region, as described with reference to FIG. 19.

The frame image acquire means 901 acquires the frame image 1802 of the interval, for which the moving object 1100 seems to exist, from the moving object interval 1001 and the digital image data 1000, and transmits it to the background difference creation means 910 and 910'. The background image creation means 902 acquires the frame image of the interval, which is judged as the background, from the moving object interval 1001 and the digital image data 1000, and transmits it as the original background image 1801 and the future background image 1803 to the background difference creation means 910 and 910'. These background difference creation means 910 and 910' repeats the processings of the background difference creation means 810 and 810', as described with reference to FIG. 15, to create the original background difference 1807 and the future background difference 1808 of the frame image. The background difference merging means 903 creates the merged background difference 1812 from the logical product of the original background difference 1807 and the future background difference 1808 of the frame image and transmits it to the moving object cutout means 904.

This moving object cutout means 904 cuts the merged background difference 1812 as the mask image out of the frame image 1802 to extract the moving object image 1804.

Figure 23:
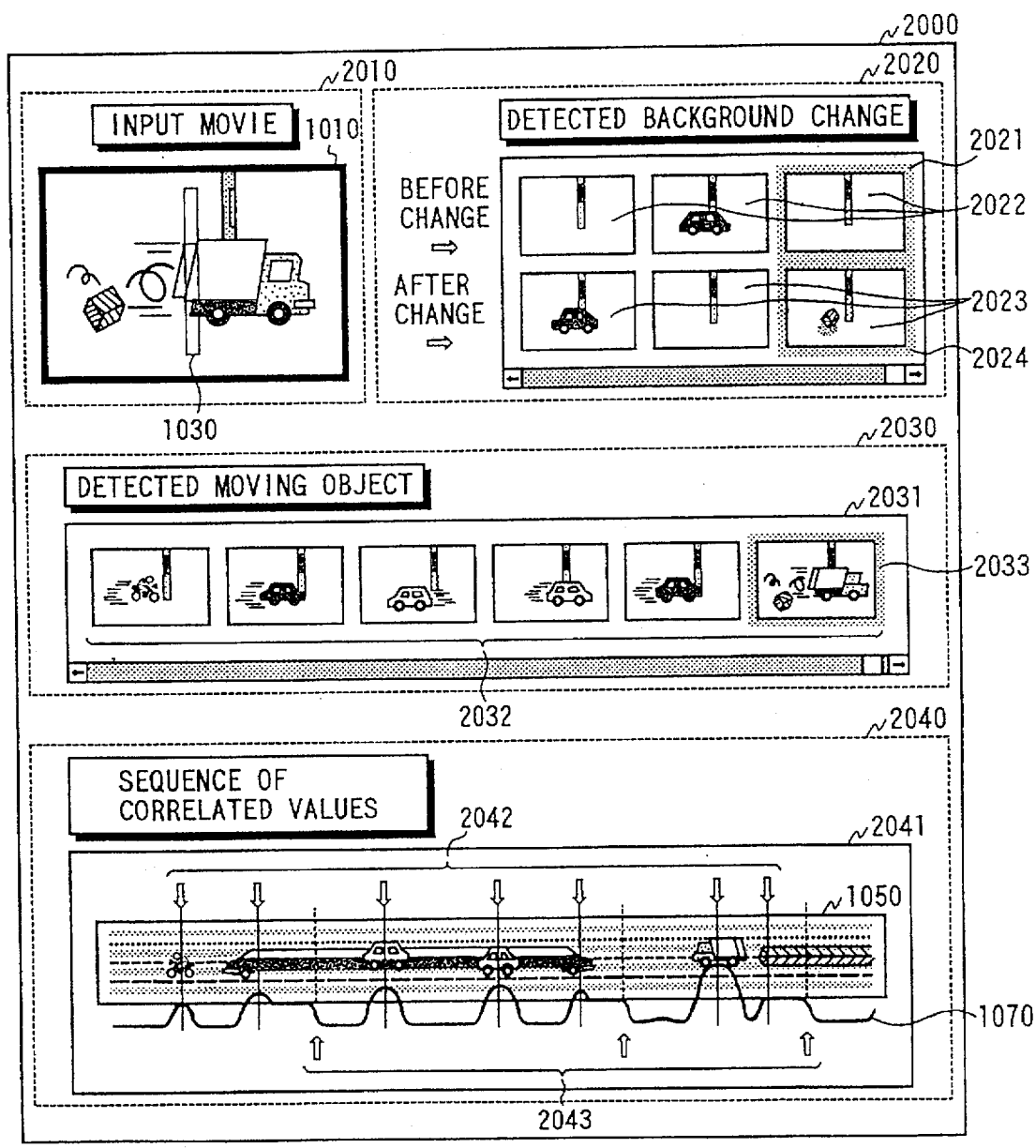
FIG. 23 shows an example of the resultant display screen which is outputted on a display 300 by result output means 600.
Figure 24:
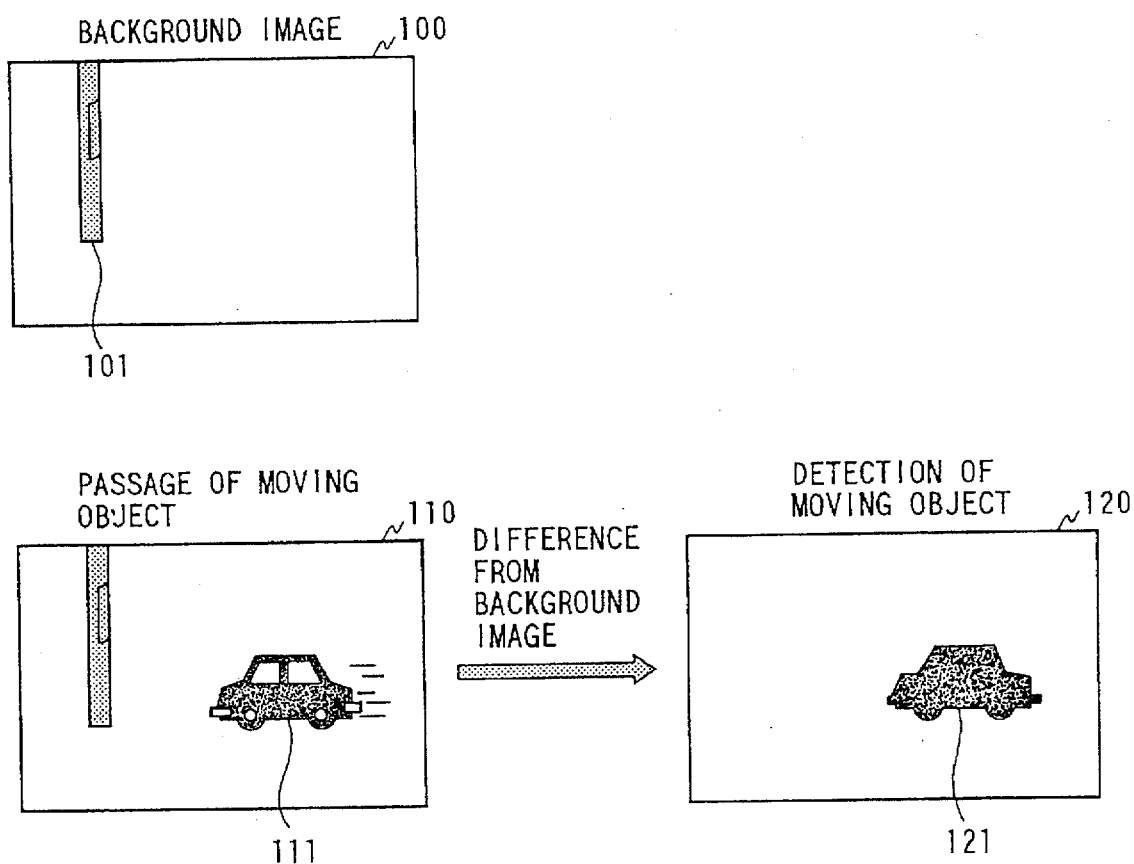
FIG. 24 shows the moving object detection/extraction by the conventional method using the background difference.

FIG. 23 shows an example of the result display screen which is outputted onto the display 300 by the result output means 600. The result display screen 2000 is constructed to include at least the four components of an input image movie display region 2010, a background change representative screen display region 2020, a moving object representative screen display region 2030 and a correlated value sequence display region 2040.

In this display result example, the slit 1030 is placed upright in the middle of the movie 1010, and a representative screen 2032 of the moving object having passed through the slit 1030 and representative screens 2022 and 2033 of the changes in the background are displayed in the background change representative screen display region 2020 and the moving object representative screen display region 2030, respectively. Moreover, the sequence (or the distance sequence 1070) of the correlated values of the slit is displayed in the correlated value sequence display region 2040 to indicate the user the grounds for judgment the present of the moving object and the background change.

The input movie display region 2010 is a portion for displaying the present movie 1010 which is inputted from the TV camera 200.

The background change representative screen display region 2020 is a portion for displaying the background representative screen 2022 before change and the background representative screen after change by detecting the structure change of the background in the movie 1010. The detected change in the background structure is displayed as a pair of upper and lower parts of the background representative screen 2022 before change and the background representative screen 2023 after change in a background change display window 2021 so that their difference may be judged by the user. This screen example displays that the background change is exemplified by the parking of an automobile or the falling object of a truck. The background change display window 2021 is provided with a scroll bar so that the change in the background structure thus far detected may be observed. At this time, a marker 2024 is attached so that the group of the latest representative screens may be quickly understood.

The moving object representative screen display region 2030 is a portion for displaying the representative screen 2032 projecting the moving object by detecting this object in the movie 1010. The detected moving object is displayed in a moving object representative screen display window 2031 so that it may be judged by the user. This screen example displays that the moving object is exemplified by a motorbike, a black automobile, a white automobile, a gray automobile or a truck. The moving object representative screen display window 2031 is provided with a scroll bar so that the representative screen of the moving objects thus far detected may be observed. At this time, moreover, a marker 2033 is attached so that the latest moving object may be discriminated.

The correlated value sequence display region 2040 is a portion for displaying both the spatial-temporal image 1050 obtained from the slit 1030 and the sequence 1070 of the correlated values (or distances) at the corresponding time. The pixels and graph values of the spatial-temporal image 1050 and the distance sequence 1070 at the latest time are always displayed at the righthand of a correlated value sequence display window 2041. At the same time, there are displayed a moving object detection marker 2042 indicating the position on the spatial-temporal image at the time of detecting the moving object and a background change detection marker 2043 indicating the position on the spatial-temporal image at the time of detecting the background change, so that the grounds for the detections may be understood at a glance by the user.

In the present embodiment, the window area of interest on the movie 1010 is exemplified by the slit 1030. For the processings in the background judgment means 700 and the moving object extraction means 900, however, essentially the same operations are undergone for an assembly of a plurality of adjacent pixels, even if the shape is different from the slit 1030.

Another embodiment conceivable for the invention is exemplified by such a window area of interest as has a square, circular or concentric shape. For example, a movie of ten and several hours, as is obtained from a TV camera attached to the entrance of a house or office, is judged with the correlated value sequence of the entire frame image so that the a list of the representative images of visitors or distributed parcels may be extracted.

According to the invention, the background and the moving object can be judged so that the moving object can be exclusively detected, even under the complicated background having a change in the illuminating condition or a structure change. For the moving object to be extracted, no restriction is exerted upon the shape, color and moving direction and velocity of the moving object. Moreover, the moving direction and velocity can be calculated.

If the background changes, this change can be judged upon whether it is the structure change or the illumination condition change.

In addition, the object to be processed is several percentages of pixels in the movie so that the processing is ten times or more as high as that of the moving object extraction apparatus of the prior art. As a result, the amount of memory to be used can also be reduced to several percentages. Thus, the real time processing can be achieved even by an inexpensive computer such as the personal computer.

The present invention has been described with reference to the preferred and alternate embodiments. Obviously, modifications and alternations will occur to those of ordinary skill in the art upon reading and understanding the invention. It is intended that the invention be construed as including all such modifications and alternations in so far they come with the scope of the appended claims or the equivalent thereof.

We claim:

1. A moving object detection apparatus comprising:

means for inputting a movie;

means for detecting a moving object from the inputted movie; and means for outputting the detected result, wherein said moving object detection means comprises background judgment means including:

means for setting a window area of interest for the background with respect to the inputted movie;

means for calculating the correlation between the data of the window area of interest in a predetermined frame and the data of the window area of interest in each frame;

means for judging the interval which is predicted to belong to the background because of absence of the moving object from the pattern of at least one of the calculated correlated value; and means for deciding the interval for which a moving object is present from the interval which is predicted to belong to the judged background;

wherein said means for judging the interval to be predicted to belong to the background judges whether the background change is caused by the illuminance change or the structure change, from the pattern of at least one of the correlated values.

2. A moving object detection apparatus comprising:

means for inputting a movie;

means for detecting a moving object from the inputted movie; and means for outputting the detected result, wherein said moving object detection means comprises background judging means including:

means for setting a window area of interest for judging the background with respect to the inputted movie;

means for calculating the correlation between the data of the window area of interest in a predetermined frame and the data of the window area of interest in each frame;

means for judging the interval, which is predicted to belong to the background because of absence of the moving object, from the pattern of at least one of the calculated correlated value; and means for deciding the interval, for which a moving object is present, from the interval which is predicted to belong to the judged background;

wherein said means for calculating the correlation between the data of the window area of interest in a predetermined frame and the data of the window area of interest in each frame by assuming the data of the window area of interest as vectors to use the distance, the inner product or the angle between the vectors as the correlated value.

3. A moving object detection apparatus comprising:

means for inputting a movie;

means for detecting a moving object from the inputted movie; and means for outputting the detected result, wherein said moving object detection means comprises background judging means including:

means for setting a window area of interest for judging the background with respect to the inputted movie;

means for calculating the correlation between the data of the window area of interest in a predetermined frame and the data of the window area of interest in each frame;

means for judging the interval, which is predicted to belong to the background because of absence of the moving object, from the pattern of at least one of the calculated correlated value; and means for deciding the interval, for which a moving object is present, from the interval which is predicted to belong to the judged background;

wherein said means for detecting of the moving object comprises moving object motion analyzing means including:

means for acquiring the frame image containing the moving object on the basis of the interval, for which the moving object is present, and for acquiring two background images, respectively, from such intervals to be predicted to belong to the background as are located before and after the interval for which the moving object is present;

means for creating two background differential images from the frame image and the background images located before and after the period of said frame image;

means for determining a merging region from the two background differential images; and means for cutting a moving object image out of said frame image and said merging region;

whereby the moving object image is extracted.

4. A moving object detection apparatus according to claim 3, wherein said means for creating the two background differential images from the frame image and the background images located before and after the period of said frame image creates the background difference by assuming the partial data of the window area of interest as vectors to use the distance, the inner product and the angle of the vectors.

5. A moving object detection apparatus comprising:

means for inputting a movie;

means for detecting a moving object from the inputted movie; and means for outputting the detected result, wherein said moving object detection means comprises background judging means including:

means for setting a window area of interest for judging the background with respect to the inputted movie;

means for calculating the correlation between the data of the window area of interest in a predetermined frame and the data of the window area of interest in each frame;

means for judging the interval, which is predicted to belong to the background because of absence of the moving object, from the pattern of at least one of the calculated correlated value; and means for deciding the interval, for which a moving object is present, from the interval which is predicted to belong to the judged background;

wherein said means for deciding the interval for which the moving object is present includes:

means for cutting out the spatial-temporal image of the interval for which the moving object is present;

means for separating the moving object region from the image regions of only the two backgrounds, as are located before and behind the interval for which the moving object is present, and the spatial-temporal image;

means for correcting the obtained moving object region by the morphology processing and the hole fill processing;

means for determining the region which is obtained from the corrected background differential image and in which the two moving object regions are merged; and means for estimating the direction/velocity of the moving object by calculating the inclination of the obtained merged region.

6. A moving object detection apparatus according to claim 5, wherein said means for determining the region, which is obtained from the corrected background differential image and in which the two moving object regions are merged, merge the regions by using the logical product of the two region images.

7. A moving object detection apparatus according to claim 6, wherein said means for outputting said detected result includes means for displaying the inputted movie, the representative screen of the detected moving object, or the representative screen of the detected background change.

8. A moving object detection apparatus according to claim 7, wherein the representative screen before the background change and the representative screen after the background change are displayed as one group.

9. A moving object detection apparatus according to claim 7, wherein the representative screens of the moving objects are displayed in a list.

10. A moving object detection apparatus according to claim 7, wherein said means for outputting said detected result includes means for simultaneously displaying the sequences of the correlated values grounding the detected moving object and background change.

11. A moving object detection apparatus according to claim 10, wherein the sequence of the correlated values of the data of the window area of interest in a predetermined frame, as grounding the detected moving object and background change, and the data of the window area of interest of each frame are simultaneously displayed.

12. A moving object detection apparatus according to claim 10, wherein the images, which are obtained by arranging the pixels of the window area of interest in each frame, as grounding the detected moving object and background change, in the chronological order, are simultaneously displayed.

13. A moving object detection apparatus comprising:
means for inputting a movie;
means for detection a moving object from the inputted movie; and
means for outputting the detected result,
wherein said moving object detection means comprises background judging means including:
means for setting a window area of interest for judging the background with respect to the inputted movie;
means for calculating the correlation between the data of the window area of interest in a predetermined frame and the data of the window area of interest in each frame;
means for judging the interval, which is predicted to belong to the background because of absence of the moving object, from the pattern of at least one of the calculated correlated value;
means for deciding the interval, for which a moving object is present, from the interval which is predicted to belong to the judged background;
moving object motion analyzing means including:
means for acquiring the frame image containing the moving object on the basis of the interval, for which the moving object is present, and for acquiring two background images, respectively; means for creating two background differential images from the frame image and the background images located before and after the period of said frame image; means for determining a merging region from the two background differential images; and means for cutting a moving object image out of said frame image and said merging region; and
moving object extracting means including: means for cutting out the spatial-temporal image of the interval for which the moving object is present; means for separating the moving object region from the image regions of only the two backgrounds, as are located before and behind the interval for which the moving object is present, and the spatial-temporal image; means for correcting the obtained moving object region by the morphology processing and the hole fill processing; means for determining the region which is obtained from the corrected background differential image and in which the two moving object regions are merged; and means for estimating the direction/velocity of the moving object by calculating the inclination of the obtained merged region.

14. A moving object detection method comprising:
setting a window area of interest for judging the background for an inputted movie;
calculating the correlation between the data of the window area of interest in a predetermined frame and the data of the window area of interest in each frame;
judging the interval, which is predicted to belong to the background because of absence of the moving object, from the pattern of at least one of the calculated correlated value; and
deciding the interval, for which a moving object is present, from the interval for which is predicted to belong to the judged background;
acquiring the frame image containing the moving object on the basis of the interval, for which the moving object is present, and acquiring two background images, respectively, from such intervals to be predicted to belong to the background as are located before and after the interval for which the moving object is present;
creating two background differential images from the frame image and the background images located before and after the period of said frame image;
determining a merging region from the two background differential images; and
cutting a moving object image out of said frame image and said merging region, and extracting the moving object image.

15. A moving object detection method according to claim 14, further comprising:
cutting out the spatial-temporal image of the interval for which the moving object is present;
separating the moving object region from the image regions of only the two backgrounds, as are located before and behind the interval for which the moving object is present, and the spatial-temporal image; and
estimating the direction/velocity of the moving object by calculating the inclination of the obtained merged region.

16. A moving object detection apparatus for detecting a moving object in a video image comprising:
a first memory for storing background image data;
a second memory for storing inputted video image data;
means for detecting a moving object according to background differences between the background image data stored in the first memory and a frame of the video image stored in the second memory;
background judging means for determining a background image, said background judging means setting a window of interest, and detecting a moving object period and a background period based on a correlation between data of the window area of interest in the background image and data of the window area of interest in each frame image following a position of the set window area of interest;
wherein said means for detecting a moving object utilizes a new background image for the previously determined background image when the new background image is in the background period where a correlation pattern is different from a correlation pattern in the background period including the previously determined background image.

17. A moving object detection apparatus according to claim 16,
wherein the window area of interest for the background judgment has a straight line or segment shape.

18. A moving object detection apparatus according to claim 16,
wherein the window area of interest for the background of judgment has a square shape.

19. A moving object detection apparatus according to claim 16, wherein said background judging means judges an interval to be predicted to belong to the background image using a correlation pattern which has no change in a correlated value for a constant period as a correlation pattern of the correlated value for judging the interval to be predicted to belong to the background image.

20. A moving object detection apparatus according to claim 16, wherein said background judging means determines whether the background image to be utilized is the previously determined background image or the new background image based upon the different correlation pattern in accordance with at a change of at least one of illuminance and structure.

* * * * *